(12) United States Patent
Yokoyama et al.

(10) Patent No.: US 12,523,596 B2
(45) Date of Patent: Jan. 13, 2026

(54) LIGHT SOURCE APPARATUS

(71) Applicant: USHIO DENKI KABUSHIKI KAISHA, Tokyo (JP)

(72) Inventors: Takuma Yokoyama, Tokyo (JP); Aya Ota, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 256 days.

(21) Appl. No.: 18/300,219

(22) Filed: Apr. 13, 2023

(65) Prior Publication Data

US 2023/0333010 A1    Oct. 19, 2023

(30) Foreign Application Priority Data

Apr. 15, 2022   (JP) .................. 2022-067886

(51) Int. Cl.
| | | |
|---|---|---|
| *G01N 21/31* | (2006.01) | |
| *G02B 6/293* | (2006.01) | |
| *G02B 6/42* | (2006.01) | |

(52) U.S. Cl.
CPC ......... *G01N 21/31* (2013.01); *G02B 6/29301* (2013.01); *G02B 6/4215* (2013.01);
(Continued)

(58) Field of Classification Search
CPC ........... G01N 21/31; G01N 2201/0696; G01N 2201/0826; G02B 6/29301; G02B 6/4215;
(Continued)

(56) References Cited

U.S. PATENT DOCUMENTS 6,278,813 B1 *  8/2001  Takada ............... H04J 14/03
                                                      385/24
6,671,298 B1 * 12/2003  Delfyett ............. H04B 10/506
                                                      372/9
(Continued)

FOREIGN PATENT DOCUMENTS

| JP | 2005-024914 A | 1/2005 |
| JP | 2016-018028 A | 2/2016 |

(Continued)

OTHER PUBLICATIONS

WO2020196692A1_translation (Year: 2020).*
(Continued)

*Primary Examiner* — Tarifur R Chowdhury
*Assistant Examiner* — Carlos Perez-Guzman
(74) *Attorney, Agent, or Firm* — Studebaker Brackett PLLC

(57) ABSTRACT

A light source apparatus generates wavelength scanning light. A pulsed light source generates pulsed light including a continuous spectrum. An optical divider spatially divides the broadband pulsed light L into a plurality of n (n≥2) beams according to wavelengths. A plurality of n fibers give different delays to the n beams. The coupler multiplexes n beams output from the n fibers. In the light source apparatus, at least a part from an incident end of the optical divider to emission ends of the n fibers has a continuous waveguide structure. A light monitoring device extracts and measures part of light propagating through the continuous waveguide structure.

14 Claims, 17 Drawing Sheets

(52) U.S. Cl.
CPC ... *G02B 6/4286* (2013.01); *G01N 2201/0696* (2013.01); *G01N 2201/0826* (2013.01)

(58) Field of Classification Search
CPC . G02B 6/4286; G02B 6/12021; G01J 3/0218; G01J 3/024; G01J 3/12; G01J 3/43; G01J 3/32; G01J 3/1895; G01J 2003/126
See application file for complete search history.

(56) References Cited

U.S. PATENT DOCUMENTS

| | | | |
|---|---|---|---|
| 7,424,223 B1* | 9/2008 | Lundquist | G02B 6/12021 385/24 |
| 9,110,259 B1* | 8/2015 | Black | G01J 3/1895 |
| 2001/0012424 A1* | 8/2001 | Kato | G02B 6/12021 385/24 |
| 2021/0344162 A1* | 11/2021 | Kane | H01S 3/0057 |
| 2021/0389237 A1 | 12/2021 | Yamada et al. | |
| 2022/0155221 A1 | 5/2022 | Ota et al. | |
| 2022/0170791 A1 | 6/2022 | Yamada et al. | |

FOREIGN PATENT DOCUMENTS

| | | | |
|---|---|---|---|
| JP | 2020-060537 A | 4/2020 | |
| JP | 2020-159973 A | 10/2020 | |
| JP | 2020-160367 A | 10/2020 | |
| WO | 2009/142109 A1 | 11/2009 | |
| WO | WO-2020196692 A1 * | 10/2020 | G01J 3/0205 |

OTHER PUBLICATIONS

An Office Action, "Notice of Reasons for Refusal," mailed by the Japanese Patent Office on Dec. 2, 2025, which corresponds to Japanese Patent Application No. 2022-067886 and is related to U.S. Appl. No. 18/300,219; with English language translation.

* cited by examiner

LIGHT SOURCE APPARATUS

CROSS-REFERENCE TO RELATED APPLICATIONS

This application is based upon and claims the benefit of priority from the prior Japanese Patent Application No. 2022-67886, filed Apr. 15, 2022, the entire contents of which are incorporated herein by reference.

BACKGROUND

1. Technical Field

The present disclosure relates to a light source apparatus and a light measurement device.

2. Description of the Related Art

Spectroscopic analysis is widely used for component analysis and inspection of an object. In the spectroscopic analysis, an object is irradiated with irradiation light, and a spectrum of object light obtained as a result of the irradiation is measured. Then, optical characteristics such as reflection characteristics (wavelength dependency) or transmission characteristics can be obtained based on the relationship between the spectrum of the object light and the spectrum of the irradiation light.

As one of methods for measuring optical characteristics, a wavelength scanning spectroscopy is known. A spectrometer of a wavelength scanning type generates wavelength scanning light the wavelength of which is changed with time, and irradiates an inspection target with the wavelength scanning light. The wavelength scanning light is a pulse or a pulse train in which time and wavelength are in a one-to-one relationship. Then, a time waveform of light obtained by irradiating the inspection target with the wavelength scanning light is detected by a light receiver. The output waveform from the optical receiver shows a spectrum with a time axis corresponding to wavelengths.

FIG. 1 is a diagram illustrating a spectroscopic apparatus 10 of a wavelength scanning type. The spectroscopic apparatus 10 includes a light source apparatus 20, a spectroscopic head 30, and an arithmetic processing device 40.

The light source apparatus 20 generates wavelength scanning light L1. The wavelength scanning light L1 is guided to the spectroscopic head 30. An irradiation optical system 31 in the spectroscopic head 30 irradiates a sample 2 with the wavelength scanning light L1. A first light receiver 32 detects light (object light) L2 obtained as a result of irradiating the sample 2 with the wavelength scanning light L1. The object light L2 may be reflected light from or transmitted light through the sample 2.

In the irradiation optical system 31, part of the wavelength scanning light L1 is split as reference light L3. A second light receiver 33 measures the reference light L3.

A first detection signal S1 generated by the first light receiver 32 and a second detection signal S2 generated by the second light receiver 33 are supplied to the arithmetic processing device 40. The object light L2 and the reference light L3 inherit the one-to-one correspondence between time and wavelength in the wavelength scanning light L1. Therefore, the time waveform of the first detection signal S1 can be converted into the spectrum of the object light L2 by converting the time axis into wavelength. Similarly, the time waveform of the second detection signal S2 can be converted into the spectrum of the reference light L3 by converting the time axis into wavelength. The arithmetic processing device 40 calculates a ratio of the object light L2 to the reference light L3 for each corresponding wavelength, and measures spectral characteristics (reflectance or transmittance) of the sample 2.

FIG. 2 is a diagram illustrating the light source apparatus 20 structured to generate the wavelength scanning light. The light source apparatus 20 includes a pulsed light source 21, wavelength selective filters 22, an optical divider 23, a delay line 24, a coupler 25, and an emission side fiber 26.

The pulsed light source 21 generates pulsed light having a continuous spectrum. The wavelength selective filters 22 select a wavelength band to be used for spectroscopy, out of the spectral components included in the pulsed light. The optical divider 23 divides the pulsed light into a plurality of n paths according to wavelengths. The delay line 24 gives a different delay to light (divided light) in each of the plurality of paths. For example, the delay line 24 includes a plurality of fibers FB1 to FBn having different lengths. The coupler 25 spatially recombines the light output from the plurality of fibers FB1 to FBn. The recombined light is emitted from the emission side fiber 26 as the wavelength scanning light L1.

As a result of studying the light source apparatus 20 for wavelength scanning light in FIG. 2, the inventors of the present invention have recognized the following problems.

In the light source apparatus 20 in FIG. 2, the optical divider 23 includes an arrayed waveguide grating (AWG). For wavelength selection of the pulsed light source 21, light is once emitted to free space before being incident on the AWG, and after a desired wavelength band is selected by wavelength selective filters 22, the light is incident on the AWG. The AWG is a single-mode waveguide and has a core diameter of about 5 to 10 μm. For this reason, in order to efficiently introduce light into the AWG, the light emitted to free space is condensed to the same size as the core diameter by a condenser lens 28. Therefore, if the condensing position of light and the relative position of the core are shifted, the incidence efficiency of the light on the AWG is significantly reduced even if the shift is on the order of micrometers. Here, due to a change in the environmental temperature at which the light source apparatus 20 is placed and a change in the temperature due to heat generation of the light source apparatus 20 itself, the position of the light extracted from the pulsed light source 21 into the space and the position of an incident end of the AWG can easily change by about several micrometers.

The decrease in the incident efficiency on the AWG is nothing but a decrease in the light amount of the wavelength scanning light L1. According to the experiments by the inventors of the present invention, specifically, a shift of a focal position on the order of micrometers causes a light-amount variation of about 20%. The light-amount variation adversely affects the performance (reproducibility and SNR) of the spectrometer. For example, when the absolute light amount decreases, a signal to noise ratio (SNR) decreases, and errors in inspection and measurement increase. Therefore, in order to perform spectroscopic measurement with high precision, it is important to suppress the light-amount variation as much as possible.

In addition, when the light condensing position is shifted from the center of the waveguide of the AWG, the light that cannot be incident on the AWG heats the AWG and increases the heat load on the AWG. Then, the temperature of the AWG gets higher and the wavelength demultiplexing performance of the AWG varies, so that a deviation of the measurement value occurs. The temperature rise also causes a decrease in reliability of the AWG.

In the spectroscopic apparatus 10 in FIG. 1, the light amount of the reference light L3 is monitored by the second light receiver 33 in the spectroscopic head 30. However, since the light amount of the reference light L3 is affected by the optical misalignment of the spectroscopic head 30 in addition to the variation of light amount output from the light source apparatus 20, it is impossible to separately detect a light-amount change in the light source apparatus 20 and a light-amount change derived from the alignment of the spectroscopic head 30. In other words, it is impossible to detect the light-amount variation of the wavelength scanning light L1 generated by the light source apparatus 20 only by monitoring the light amount of the reference light L3.

In addition, even if emitted light from the pulsed light source 21 is monitored, a change in the incident efficiency on the AWG of the optical divider 23 cannot be detected, and thus, the light-amount variation of the wavelength scanning light L1 output from the light source apparatus 20 cannot be detected.

Note that this problem should not be regarded as a general recognition of those skilled in the art, but the inventors of the present invention have independently recognized this problem.

SUMMARY

The present disclosure has been made in view of the above problems.

One aspect of the present disclosure relates to a light source apparatus structured to generate wavelength scanning light. The light source apparatus includes a pulsed light source structured to generate pulsed light including a continuous spectrum, an optical divider structured to spatially divide the pulsed light into a plurality of n (n≥2) beams according to wavelengths, a plurality of n fibers structured to give different delays to the n beams, and a coupler structured to multiplex the n beams output from the n fibers. At least a part from the incident end of the optical divider to the emission ends of the n fibers has a continuous waveguide structure. The light source apparatus further includes a light monitoring device structured to extract and measure part of light propagating through the continuous waveguide structure.

Note that any desired combination of the above constituent elements and mutual replacement of the constituent elements and expressions among methods, apparatuses, systems, and the like are also effective as aspects of the present invention or the present disclosure. Furthermore, the description of this section ("SUMMARY") does not describe all essential features of the present invention, and therefore the subcombinations of these features described herein may also be the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Summary of Embodiments

Figure 1:
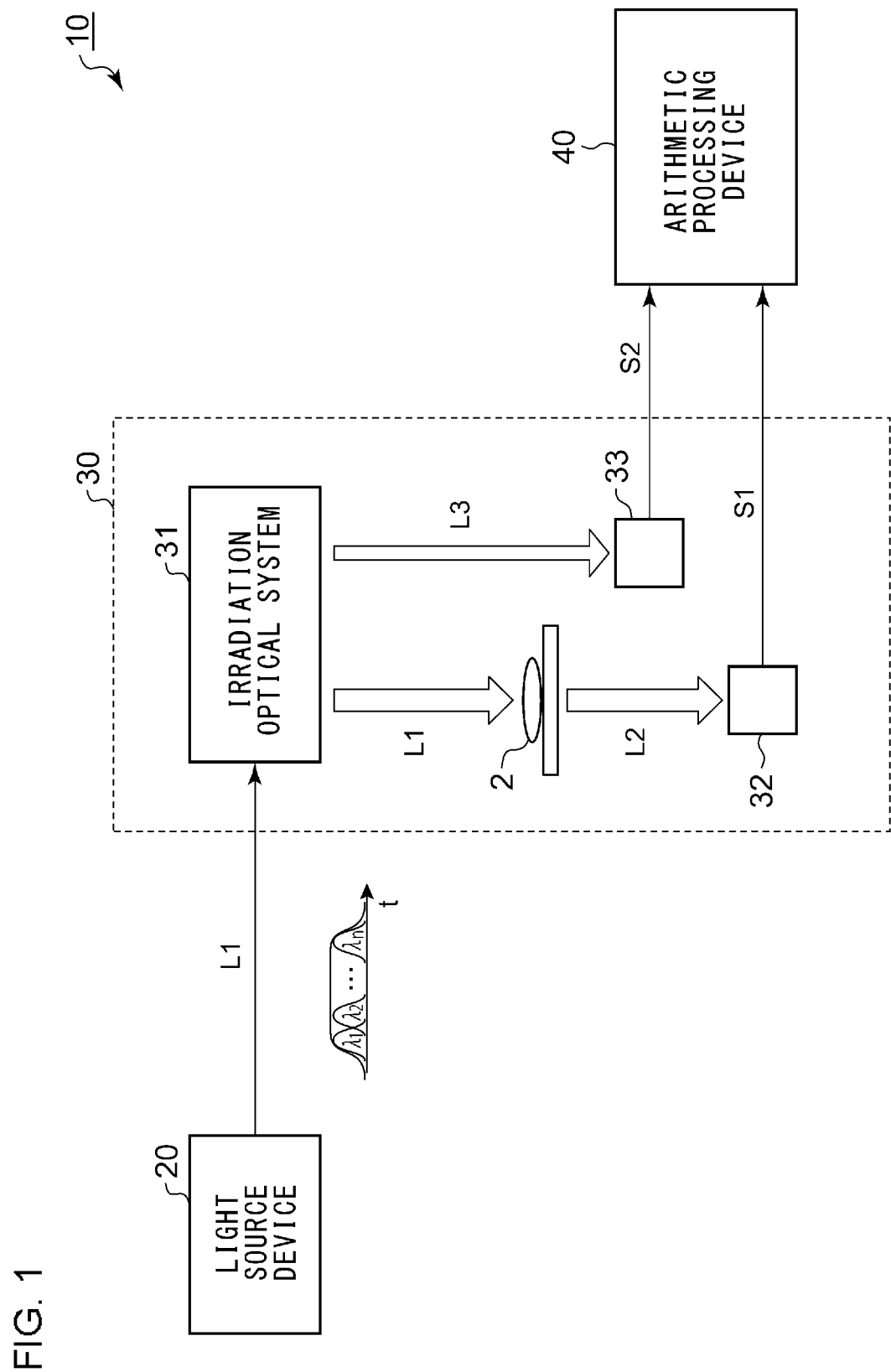
FIG. 1 is a diagram illustrating a spectroscopic apparatus of a wavelength scanning type.
Figure 2:
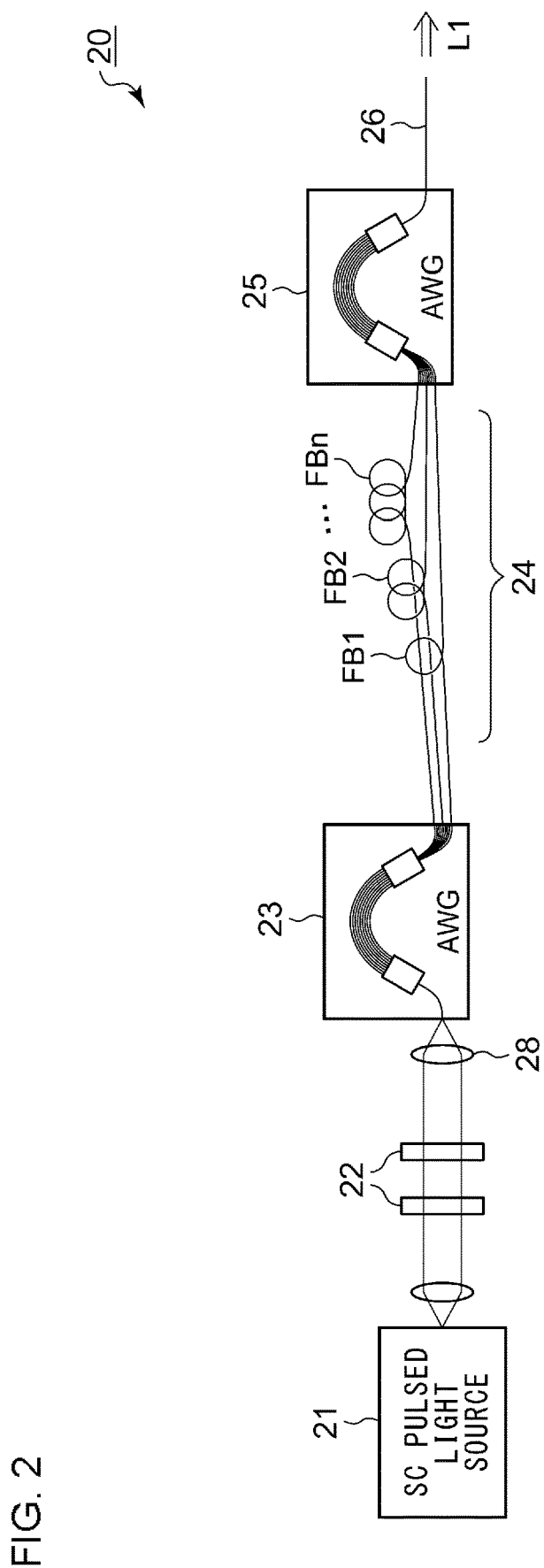
FIG. 2 is a diagram illustrating a light source apparatus structured to generate wavelength scanning light.

An overview of some exemplary embodiments of the present disclosure will be described. This summary describes some concepts of one or more embodiments in a simplified manner for the purpose of basic understanding of the embodiments as a prelude to the detailed description that follows, and does not limit the breadth of the invention or disclosure. Also, this summary is not a comprehensive overview of all conceivable embodiments and does not limit the essential components of the embodiments. For convenience, "one embodiment" may be used to refer to one embodiment (example or modification) or a plurality of embodiments (examples or modifications) disclosed in the present description.

A light source apparatus according to an embodiment generates wavelength scanning light. The light source apparatus includes a pulsed light source structured to generate pulsed light including a continuous spectrum, an optical divider structured to spatially divide the pulsed light into a plurality of n (n≥2) beams according to wavelengths, a plurality of n fibers structured to give different delays to the n beams, and a coupler structured to multiplex the n beams output from the n fibers. At least a part from an incident end of the optical divider to an emission ends of the n fibers has a continuous waveguide structure. The light source apparatus further includes a light monitoring device structured to extract and measure part of light propagating through the continuous waveguide structure.

The "continuous waveguide structure" refers to a waveguide in which a fiber, a waveguide formed on a planar lightwave circuit (PLC), and the like are continued without free space interposed therebetween. The light source apparatus described above can measure a light amount by taking out part of light extracted from the continuous waveguide structure. As a result, not only the light-amount variation of the wavelength scanning light caused by the light-amount variation of the pulsed light generated by the pulsed light source, but also the light-amount variation of the wavelength scanning light caused by incident efficiency variation on the waveguide (that is, the change in the focal position) can be accurately detected.

Note that, in general, part of the wavelength scanning light is not intentionally extracted from the waveguide and monitored, and such a contrivance can be implemented only after the above-described problem is recognized.

The inventors of the present invention have independently recognized that the change in the relative position between the incident end and the focal position of the optical divider changes not only the light-amount change of the wavelength scanning light but also the spectrum of the wavelength scanning light. Therefore, it is desirable to have a configuration capable of detecting the light-amount change for each wavelength.

In one embodiment, the light source apparatus may further include m optical couplers corresponding to m (1≤m≤n) fibers out of the n fibers. Each optical coupler extracts part of the beam propagating through the corresponding fiber. The light monitoring device may measure the m beams extracted by the m optical couplers. With this configuration, it is possible to monitor light of a specific wavelength propagating through a fiber provided with an optical coupler.

In one embodiment, m may satisfy m≥2. As a result, the light amounts of a plurality of wavelengths can be individually monitored, and a light-amount variation having a wavelength dependency can be accurately detected.

In one embodiment, the optical divider may include: an incident side fiber having an incident end on which the pulsed light is incident; and a first arrayed waveguide grating. The first arrayed waveguide grating includes: an input waveguide connected to an output end of the incident side fiber; and n output waveguides, the first arrayed waveguide grating being structured to split light propagating through the input waveguide into the n output waveguides according to wavelengths. The light source apparatus may further include an optical coupler (branch coupler) provided to the incident side fiber and structured to extract part of the pulsed light propagating through the incident side fiber. The light monitoring device may measure the light extracted from the incident side fiber by the optical coupler.

In one embodiment, the light monitoring device may include a wavelength division multiplexing (WDM) coupler structured to divide the light extracted from the incident side fiber by the optical coupler into m (m≥2) beams according to wavelengths, and may measure each of the m beams divided by the WDM coupler. As a result, the light amounts of a plurality of wavelengths can be individually monitored, and a light-amount variation having a wavelength dependency can be accurately detected.

In one embodiment, the coupler may include: a second arrayed waveguide grating; and an emission side fiber. The second arrayed waveguide grating includes: n input waveguides connected to the n fibers; and an output waveguide, the second arrayed waveguide grating being structured to multiplex the n beams propagating through the n input waveguides and output the multiplexed light to the output waveguide. The emission side fiber has an incident end connected to the output waveguide of the second arrayed waveguide grating. The light source apparatus may further include an optical coupler provided to the emission side fiber and structured to extract part of light propagating through the emission side fiber. The light monitoring device may measure the light extracted from the emission side fiber by the optical coupler.

In one embodiment, the light monitoring device may include a wavelength division multiplexing (WDM) coupler that divides the light extracted from the emission side fiber by the optical coupler into m (m≥2) beams according to wavelengths. The light monitoring device may monitor the m beams divided by the WDM coupler.

In one embodiment, m may satisfy m≥2. In this case, the light amounts of a plurality of wavelengths can be individually monitored, and a light-amount variation having a wavelength dependency can be accurately detected.

In one embodiment, the light monitoring device may measure a time waveform of the light extracted from the emission side fiber by the optical coupler. The light propagating through the emission side fiber is wavelength scanning light having a positive or negative chirp, and has a one-to-one correspondence between time and wavelength. Therefore, by measuring the time waveform, the light-amount variation for each wavelength can be accurately detected.

In one embodiment, the optical divider may include a first arrayed waveguide grating. The first arrayed waveguide grating includes: an input waveguide structured to receive the pulsed light; and n output waveguides, the first arrayed waveguide grating being structured to split light propagating through the input waveguide into the n output waveguides according to wavelengths. The light source apparatus may further include a waveguide demultiplexer formed on the same planar lightwave circuit (PLC) as the first arrayed waveguide grating, the waveguide demultiplexer being structured to extract part of light propagating through the input waveguide of the first arrayed waveguide grating. The light monitoring device may monitor light extracted by the waveguide demultiplexer.

In one embodiment, the optical divider may include a first arrayed waveguide grating. The first arrayed waveguide grating includes: an input waveguide structured to receive the pulsed light; and n output waveguides, the first arrayed waveguide grating being structured to split light propagating through the input waveguide into the n output waveguides according to wavelengths. The light source apparatus may further include m waveguide demultiplexers formed on the same planar lightwave circuit (PLC) as the first arrayed waveguide grating and corresponding to m (1≤m≤n) output waveguides out of the n output waveguides of the first arrayed waveguide grating. Each of the waveguide demultiplexers may be structured to extract part of light propagating through the corresponding output waveguide. The light monitoring device may monitor m beams extracted by the m waveguide demultiplexers.

In one embodiment, the coupler may include a second arrayed waveguide grating. The second arrayed waveguide grating includes: n input waveguides connected to the n fibers; and an output waveguide, the second arrayed waveguide grating being structured to multiplex the n beams propagating through the n input waveguides and output the multiplexed light to the output waveguide. The light source apparatus may further include m waveguide demultiplexers formed on the same planar lightwave circuit (PLC) as the second arrayed waveguide grating and corresponding to m (1≤m≤n) input waveguides out of the n input waveguides of the second arrayed waveguide grating. Each of the waveguide demultiplexers may be structured to extract part of light propagating through the corresponding input waveguide. The light monitoring device may monitor m beams extracted by the m waveguide demultiplexers.

In one embodiment, m may satisfy m≥2. In this case, the light amounts of a plurality of wavelengths can be individually monitored, and a light-amount variation having a wavelength dependency can be accurately detected.

In one embodiment, the coupler may include a second arrayed waveguide grating. The second arrayed waveguide grating includes: n input waveguides connected to the n fibers; and an output waveguide, the second arrayed waveguide grating being structured to multiplex the n beams propagating through the n input waveguides and output the multiplexed light to the output waveguide. The light source apparatus may further include a waveguide demultiplexer formed on the same planar lightwave circuit (PLC) as the second arrayed waveguide grating, the waveguide demultiplexer being structured to extract part of light propagating through the output waveguide of the second arrayed waveguide grating. The light monitoring device may monitor light extracted by the waveguide demultiplexer.

In one embodiment, the light source apparatus may further include a wavelength selective filter disposed between the pulsed light source and the optical divider.

A light measurement device according to one embodiment may include: any one of the light source apparatuses described above structured to generate wavelength scanning light; and a light receiving device structured to measure object light obtained by irradiating an object with the wavelength scanning light.

EMBODIMENTS

Hereinafter, the present disclosure will be described on the basis of preferred embodiments with reference to the drawings. The same or equivalent constituent elements, members, and processes illustrated in the drawings are denoted by the same reference numerals, and redundant description will be omitted as appropriate. Furthermore, the embodiments are not intended to limit the disclosure, but are merely examples, and all features described in the embodiments and combinations thereof are not necessarily essential to the disclosure.

Dimensions (thickness, length, width, and the like) of each member illustrated in the drawings may be appropriately enlarged or reduced for easy understanding. Furthermore, the dimensions of the plurality of members do not necessarily indicate the relationships in size of the members, and even if a certain member A is drawn thicker than another member B in one drawing, the member A may be thinner than the member B.

Figure 3:
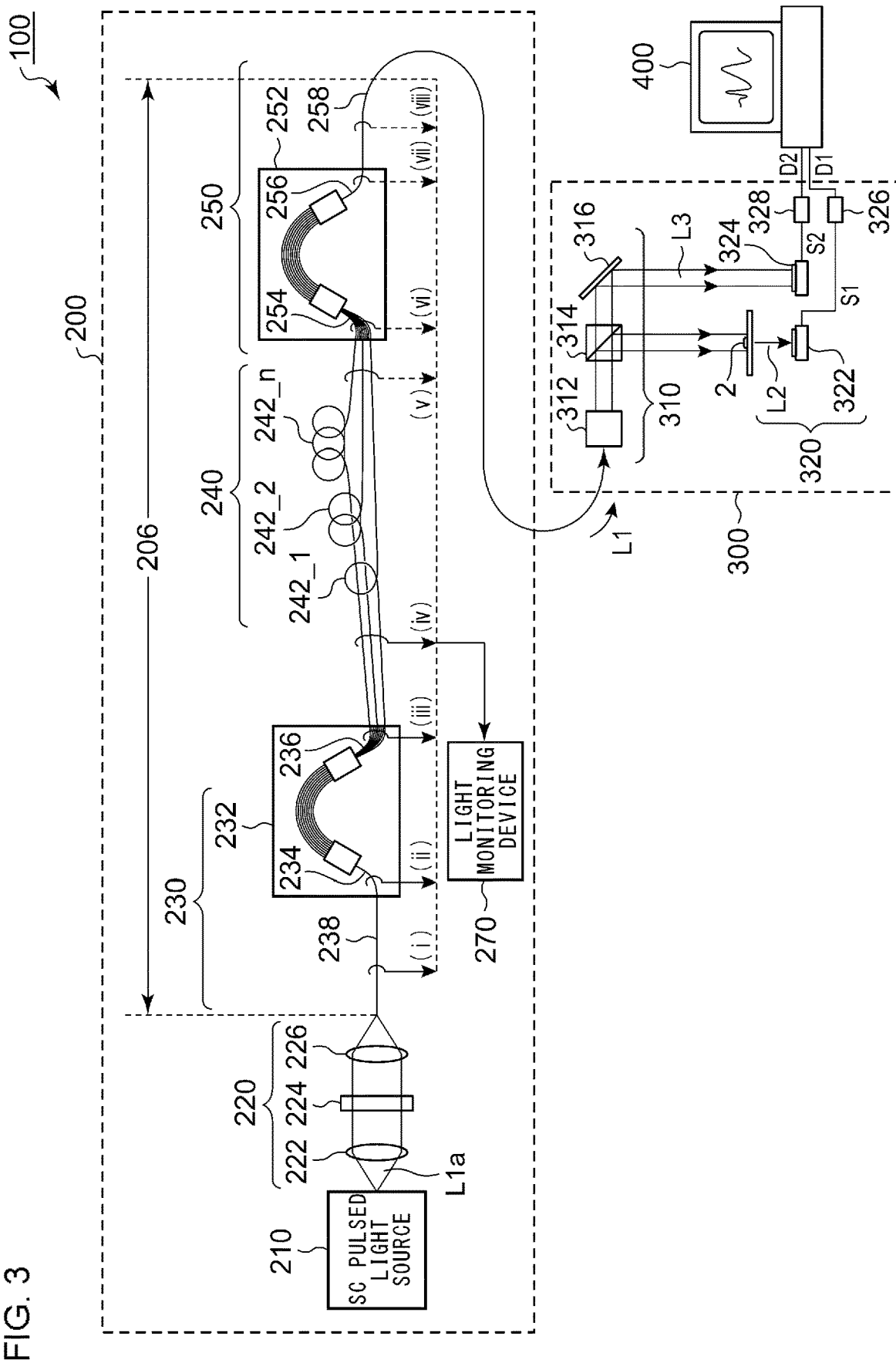
FIG. 3 is a diagram illustrating a light measurement device according to an embodiment.

FIG. 3 is a diagram illustrating a light measurement device 100 according to an embodiment; The light measurement device 100 includes a light source apparatus 200, a spectroscopic head 300, and an arithmetic processing device 400.

The light source apparatus 200 generates wavelength scanning light L1 the wavelength of which is changed with time. In the wavelength scanning light L1, time and wavelength are associated with each other in a one-to-one relationship. In other words, the wavelength scanning light L1 "has uniqueness of wavelength".

Figure 4:
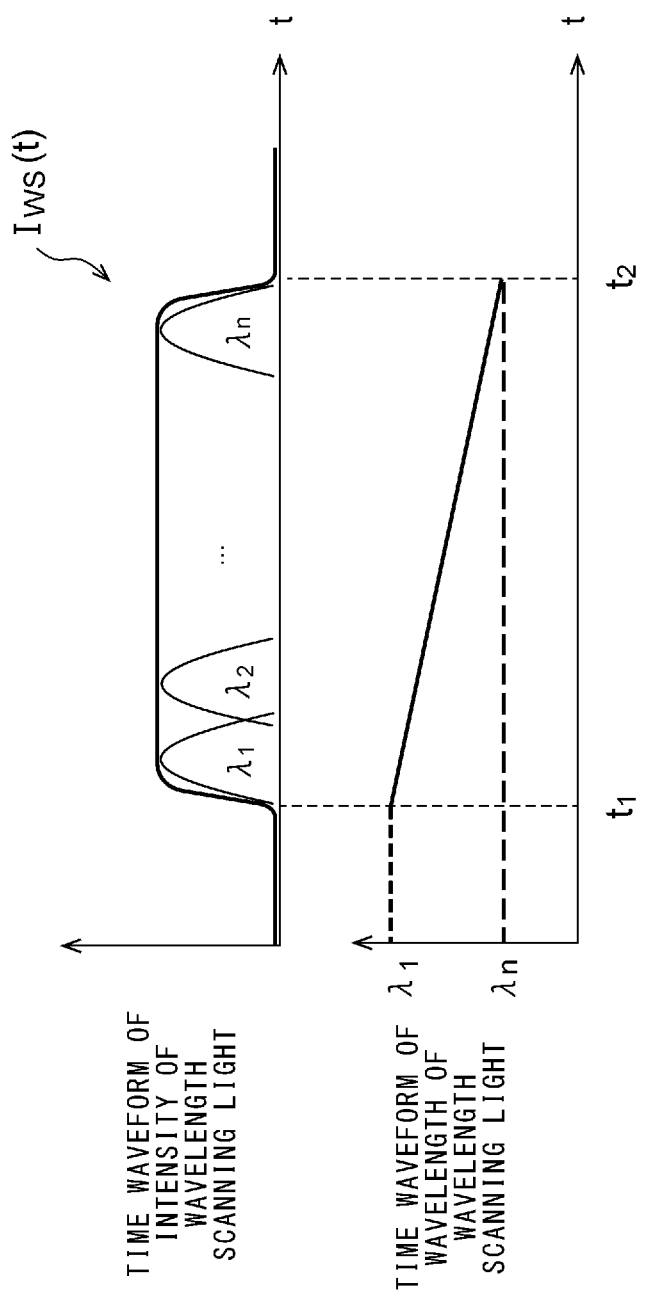
FIG. 4 is a diagram illustrating the wavelength scanning light.

FIG. 4 is a diagram illustrating the wavelength scanning light L1. In FIG. 4, the upper part illustrates the intensity (time waveform) $I_{ws}(t)$ of the wavelength scanning light L1, and the lower part illustrates the time change of the wavelength $\Lambda$ of the wavelength scanning light L1. In this example, the wavelength scanning light L1 is one pulse light, $\lambda_1$ is the dominant wavelength at the front edge, $\lambda_n$ is the dominant wavelength at the rear edge, and the wavelength temporally changes from $\lambda_1$ to $\lambda_n$ within one pulse. In this example, the wavelength scanning light L1 is a positive chirp pulse ($\lambda_1 > \lambda_n$) in which the frequency is increased with time, in other words, the wavelength is shortened with time. The wavelength scanning light L1 may be a negative chirp pulse ($\lambda_1 < \lambda_n$) in which the wavelength is lengthened with time. As described later, the wavelength scanning light L1 may be a pulse train including temporally isolated pulses (wave packets) for each wavelength.

Return to FIG. 3. The spectroscopic head 300 includes an irradiation optical system 310 and a light receiving device 320. The irradiation optical system 310 receives the wavelength scanning light L1 from the light source apparatus 200. The irradiation optical system 310 includes a collimator 312, a beam splitter 314, and a mirror 316. The collimator 312 collimates the wavelength scanning light L1 emitted from an emission side fiber 258. The beam splitter 314 directs part of the wavelength scanning light L1 toward a sample 2. The beam splitter 314 also extracts part of the wavelength scanning light L1 as reference light L3. The mirror 316 directs the reference light L3 to the light receiving device 320.

The light receiving device 320 includes a first light receiver 322, a second light receiver 324, and A/D converters 326, 328. The first light receiver 322 detects light (object light) L2 obtained as a result of irradiating the sample 2 with the wavelength scanning light L1. The object light L2 may be reflected light or transmitted light.

The A/D converter 326 converts an output signal S1 of the first light receiver 322 into a digital signal D1. The second light receiver 324 detects the reference light L3. The A/D converter 328 converts an output signal S2 of the second light receiver 324 into a digital signal D2. The time waveform $I_{OBJ}(t)$ of the object light L2 indicated by the digital signal D1 and the time waveform $I_{REF}(t)$ of the reference light L3 indicated by the digital signal D2 are taken into the arithmetic processing device 400.

In the wavelength scanning spectroscopy, the time and the wavelength in the wavelength scanning light L1 have a one-to-one correspondence. This correspondence is naturally included in the reference light L3 and is inherited to the object light L2. Using the correspondence between time and wavelength, the arithmetic processing device 400 converts the time waveform $I_{OBJ}(t)$ of the object light L2 into the spectrum $I_{OBJ}(\lambda)$ in the frequency domain. In addition, the arithmetic processing device 400 calculates a reference spectrum $I_{REF}(\lambda)$ by converting the time waveform $I_{REF}(t)$ of the reference light L3 into a spectrum and appropriately scaling the spectrum.

The processing by the arithmetic processing device 400 is not particularly limited, but as an example, the arithmetic processing device 400 can calculate the transmittance $T(\lambda)$ or the reflectance $R(\lambda)$ of an object OBJ on the basis of the reference spectrum $I_{REF}(\lambda)$ and the spectrum $I_{OBJ}(\lambda)$ of the object light L2.

$$T(\lambda)=I_{OBJ}(\lambda)/I_{REF}(\lambda)$$

$$R(\lambda)=I_{OBJ}(\lambda)/I_{REF}(\lambda)$$

Figure 5:
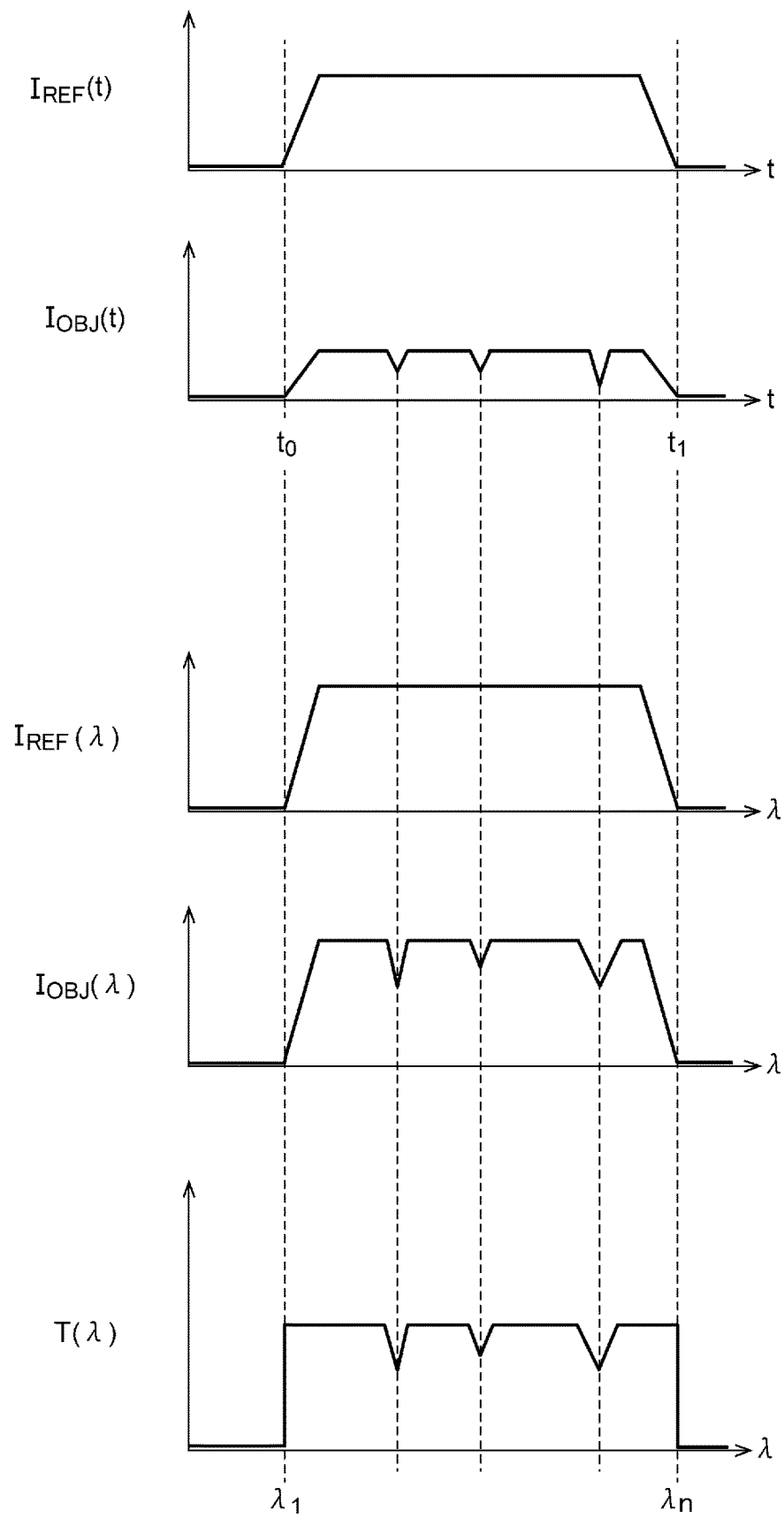
FIG. 5 is a diagram for explaining the spectroscopy by the light measurement device in FIG. 3.

FIG. 5 is a diagram for explaining the spectroscopy by the light measurement device 100 in FIG. 3. As described above, in the wavelength scanning light L1, the time t and the wavelength $\lambda$ correspond to each other on a one-to-one basis, so that the time waveform $I_{REF}(t)$ of the wavelength scanning light L1 can be converted into the spectrum $I_{REF}(\lambda)$ in the frequency domain.

Also in the time waveform $I_{OBJ}(t)$ of the object light L2, the time t and the wavelength $\lambda$ correspond to each other on a one-to-one basis. Therefore, the arithmetic processing device 400 can convert the waveform $I_{OBJ}(t)$ of the object light L2 represented by the output of the light receiving device 320 into the spectrum $I_{OBJ}(\lambda)$ of the object light L2.

The arithmetic processing device 400 can calculate the transmission spectrum $T(\lambda)$ of the object OBJ on the basis of the ratio $I_{OBJ}(\lambda)/I_{REF}(\lambda)$ of the two spectra $I_{OBJ}(\lambda)$ and $I_{REF}(\lambda)$.

The relationship between the wavelength $\lambda$ and the time t in the wavelength scanning light L1 is expressed by a function $\lambda=f(t)$. Most simply, the wavelength $\lambda$ varies linearly with the time t according to a linear function. When the time waveform $I_{OBJ}(t)$ of the object light L2 is damped at a certain time $t_x$, it means that the transmission spectrum $T(\lambda)$ has an absorption spectrum at a wavelength $\lambda_x=f(t_x)$.

Note that the processing in the arithmetic processing device 400 is not limited thereto. The transmission spectrum $T(\lambda)$ may be derived by computing the ratio $T(t)=I_{OBJ}(t)/I_{REF}(t)$ of the two time waveforms $I_{OBJ}(t)$ and $I_{REF}(t)$ of time and then converting the variable t of the time waveform $T(t)$ into $\lambda$.

The basic configuration and operation of the light measurement device 100 have been described above. Next, a configuration of the light source apparatus 200 will be described.

The light source apparatus 200 includes a pulsed light source 210, a wavelength selector 220, an optical divider 230, a delay line 240, a coupler 250, and a light monitoring device 270.

The pulsed light source 210 emits broadband pulsed light L1a having a broadband continuous spectrum. The spectrum of the broadband pulsed light L1a is continuous over a wavelength range having a width of at least 10 nm, preferably 50 nm, and more preferably 100 nm, for example, in a range of 900 nm to 1300 nm. The width of the wavelength range of the broadband pulsed light L1a may cover a wavelength range necessary for spectroscopy.

For example, the pulsed light source 210 may include an ultrashort pulsed laser and a non-linear element. Examples of the ultrashort pulsed laser include a gain-switched laser, a microchip laser, and a fiber laser.

The nonlinear element further widens the spectral width of ultrashort pulses generated by the ultrashort pulsed laser, by a nonlinear phenomenon. As the nonlinear element, a fiber is suitable, and for example, a photonic crystal fiber or another nonlinear fiber can be used. The mode of the fiber is preferably the single mode, but the multimode can be used as long as it exhibits sufficient nonlinearity.

As the pulsed light source 210, another broadband pulsed light source such as a superluminescent diode (SLD) light source may be used.

The broadband pulsed light L1a output from the nonlinear element has a pulse width on the order of femtoseconds to nanoseconds. The optical divider 230, the delay line 240, and the coupler 250 receive the broadband pulsed light L1a and convert the broadband pulsed light L1a into wavelength scanning light L1.

The broadband pulsed light L1a generated by the pulsed light source 210 is once emitted to free space. The wavelength selector 220 selects a wavelength band to be used for measurement from the broadband pulsed light L1a and removes a wavelength band not to be used. For example, the wavelength selector 220 includes a lens 222, wavelength selective filters 224, and a condenser lens 226.

The lens 222 collimates the broadband pulsed light L1a. The wavelength selective filters 224 transmit a wavelength band used for measurement and remove a wavelength band not used, by reflection or absorption. The condenser lens 226 condenses the transmitted light through the wavelength selective filters 224 to an incident end of the optical divider 230.

The optical divider 230 includes an incident side fiber 238 and a first AWG 232. The first AWG 232 includes an input waveguide 234 and a plurality of n (n≥2) output waveguides 236. The first AWG 232 receives the broadband pulsed light L1a through the incident side fiber 238. The first AWG 232 splits the light propagating through the input waveguide 234 into the n output waveguides 236 according to wavelengths.

The delay line 240 includes a plurality of n fibers 242_1 to 242_n. The fibers 242_1 to 242_n have different lengths and provide different delays to multiple beams divided by the optical divider 230.

It is assumed that the broadband pulsed light L1a before divided is a positive chirp pulse (up-chirp pulse) in which the frequency is increased (wavelength is shortened) with time. In this case, the component having the longest wavelength $\lambda_1$ is included in the leading edge of the pulse, and the component having the shortest wavelength $\lambda_n$ is included in the trailing edge of the pulse.

The plurality of fibers 242_1 to 242_n have different lengths $l_1$ to $l_n$. Assuming that $\lambda_1$ is the longest wavelength and $\lambda_n$ is the shortest wavelength, it is only necessary to satisfy the relationship of $l_1<l_2<\ldots<l_n$ in order to make the wavelength scanning light L1 the positive chirp pulse same as the broadband pulsed light L1a. As an example, when n=20, the lengths $l_1$ to $l_{20}$ of the 20 fibers 242 may increase from 1 m to 20 m in increments of 1 m.

The fibers 242_1 to 242_n do not need to have different group delay characteristics for each wavelength, and fibers that are the same (fibers with the same core/cladding material) can be used. In this sense, it is capable of using multi-mode fibers for the fibers 242 and is advantageous in that unintended non-linear optical effects can be prevented in this case.

The coupler 250 recombines the plurality of beams to which different delays are applied by the delay line 240. For example, the coupler 250 includes a second AWG 252 and an emission side fiber 258. The second AWG 252 includes n input waveguides 254 and an output waveguide 256. The n input waveguides 254 are connected to the n fibers 242_1 to 242_n. The second AWG 252 multiplexes the n beams propagating through the n input waveguides 254, and outputs the multiplexed beam to an output waveguide 256. An incident end of the emission side fiber 258 is connected to the output waveguide 256.

The emission side fiber 258 extends to the spectroscopic head 300, and an emission end of the emission side fiber 258 is connected to the spectroscopic head 300.

When a sufficiently large delay is given by the fibers 242, the wave packets for the wavelengths $\lambda_1$ to $\lambda_n$ are temporally isolated from one another, and the wavelength scanning light L1 becomes a pulse train including n pulses corresponding to the wavelengths $\lambda_1$ to $\lambda_n$.

In the light source apparatus 200, a part from the incident end of the optical divider 230 to the emission end of the coupler 250 is formed with a continuous waveguide structure 206. That is, between the incident end of the optical divider 230 and the output end of the coupler 250, the light is never emitted to free space.

The coupler 250 may include an optical element other than an AWG. In this case, the continuous waveguide structure 206 is between the incident end of the optical divider 230 and the emission end of the delay line 240. That is, in the light source apparatus 200, it can be said that at least a part from the incident end of the optical divider 230 to the emission end of the delay line 240 (fibers 242) is formed with the continuous waveguide structure 206.

The light monitoring device 270 extracts and measures part of light propagating through the waveguide structure 206. A place where the light is extracted from the waveguide structure 206 is not particularly limited, and for example, the light can be extracted from any of (i) to (viii) in FIG. 3.

(i), (iv), (v), and (viii) represent extraction of light from the fiber. An optical coupler, which is also called splitter, tap coupler, Y-coupler or T-coupler can be used to extract part of light from the fiber.

(ii), (iii), (vi), and (vii) represent extraction of light from the AWG. In order to extract part of light from the AWG, a waveguide demultiplexer formed on the same planar lightwave circuit (PLC) as the AWG can be used.

The light monitoring device 270 monitors light extracted from the waveguide structure 206 in the light source apparatus 200. For example, the light monitoring device 270 may generate an alert when a variation in the light being monitored satisfies a predetermined condition.

The above is the configuration of the light source apparatus 200.

Advantages of the light source apparatus 200 are clarified by comparison with some comparative techniques. In the first comparison technique, the reference light L3 is monitored by the second light receiver 324, and the variation of the reference light L3 is detected. In this case, the reference light emitted to free space in the spectroscopic head 300 is monitored. Therefore, the detection result is affected by a variation in the surrounding environment of the spectroscopic head 300 (temperature, vibration) and optical axis adjustment, so that the absolute light amount of the wavelength scanning light L1 generated by the light source apparatus 200 cannot be measured.

The second comparison technique monitors broadband pulsed light L1a emitted from the pulsed light source 210 to free space. In this case, although the light-amount variation of the broadband pulsed light L1a can be detected, the light-amount variation of the wavelength scanning light L1 due to the shift of position between the focal position of the condenser lens 226 and the incident end of the optical divider 230 cannot be detected, so that the absolute light amount of the wavelength scanning light L1 cannot be measured.

As compared with the first and the second comparison techniques, the light source apparatus 200 according to the embodiment can accurately detect not only the light-amount variation of the wavelength scanning light L1 due to the light-amount variation of the broadband pulsed light L1a generated by the pulsed light source 210, but also the light-amount variation of the wavelength scanning light L1 due to the incident efficiency variation on the waveguide structure 206, in other words, the incident end of the optical divider 230 (that is, the change in the focal position of the condenser lens 226).

In addition, the light to be monitored by the light monitoring device 270 is extracted from the continuous waveguide structure 206. That is, the light monitoring device 270 does not monitor light in free space, and is therefore advantageous in that it is not affected by variation in the surrounding environment (temperature, vibration) and optical axis adjustment.

In a situation where the absolute amount of the light amount of the light source apparatus 200 decreases, there is a high possibility that the input end of the optical divider 230 and the focal position of the condenser lens 226 are shifted, and there is a possibility that heat generation in the optical divider 230 increases. In a case where the light monitoring device 270 detects a decrease in light amount, it is possible to prevent the light source apparatus 200 from continuing to operate in a state where the alignment is shifted, by generating an alert.

The present disclosure extends to various apparatuses and methods grasped from FIG. 3 or derived from the above description, and is not limited to a specific configuration. Hereinafter, more specific examples will be described in order not to narrow the scope of the present disclosure but to help understanding of the present disclosure and the essence and operation of the present invention and to clarify them.

Example 1

Figure 6:
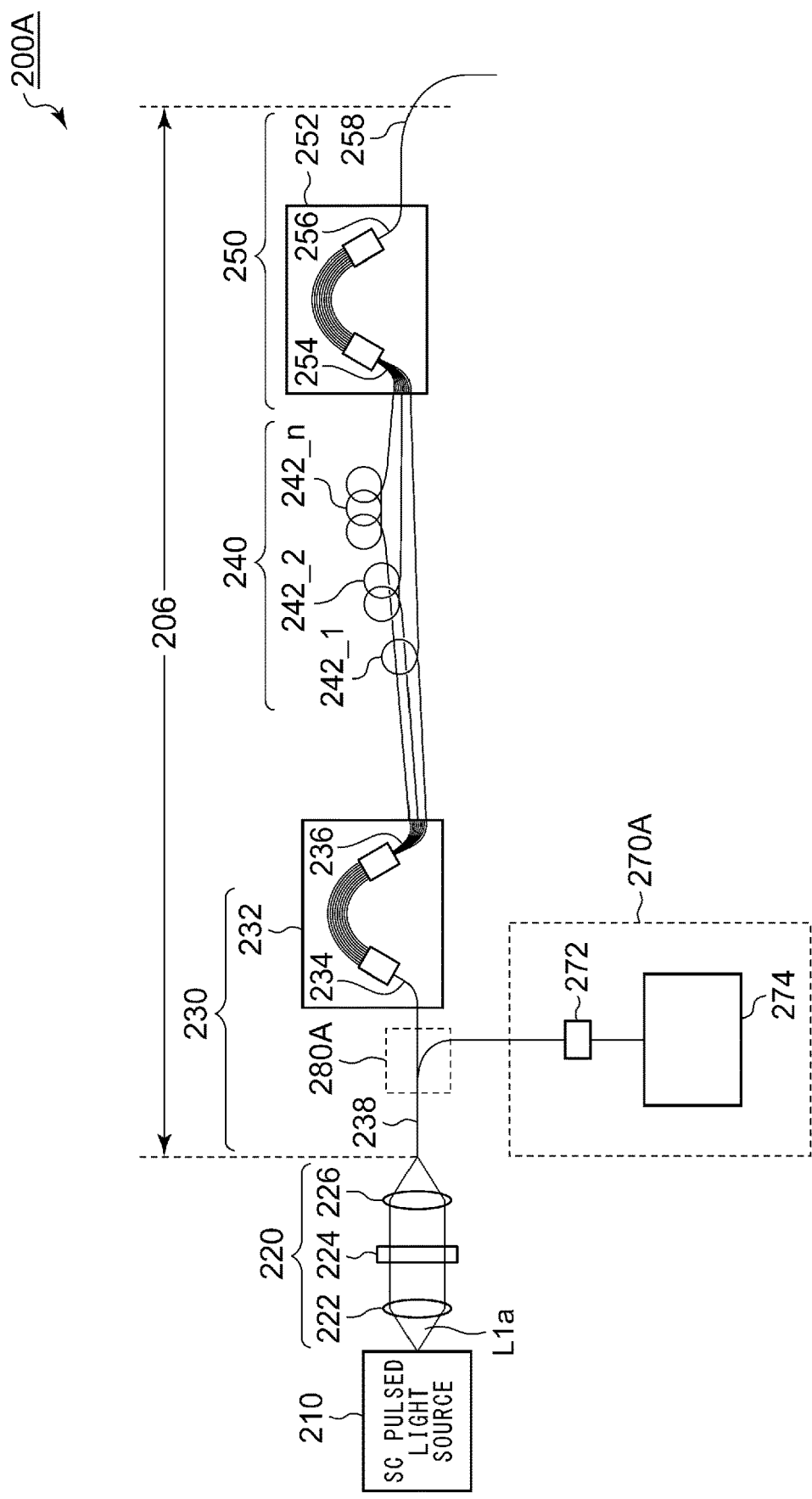
FIG. 6 is a diagram illustrating the light source apparatus according to Example 1.

FIG. 6 is a diagram illustrating a light source apparatus 200A according to Example 1. A light monitoring device 270A monitors light extracted from the position (i) in FIG. 3. The incident side fiber 238 is provided with an optical coupler 280A. The optical coupler 280A has two output fibers, one of the output fibers is connected to the first AWG 232, and the other output fiber is connected to the light monitoring device 270A. Part of light propagating through the incident side fiber 238 is incident on the light monitoring device 270A.

The light monitoring device 270A includes a light detector 272 and an arithmetic processing device 274. The light detector 272 detects light extracted from the waveguide structure 206 by the optical coupler 280A. The arithmetic processing device 274 detects an absolute light-amount variation of the wavelength scanning light L1, which is the output of the light source apparatus 200A, on the basis of the output of the light detector 272.

Example 2

In Example 2, a technique for detecting a spectral variation of the wavelength scanning light L1 in addition to or instead of the absolute light-amount variation of the wavelength scanning light L1 will be described. First, the reason why the spectral variation needs to be detected will be described.

Figure 7:
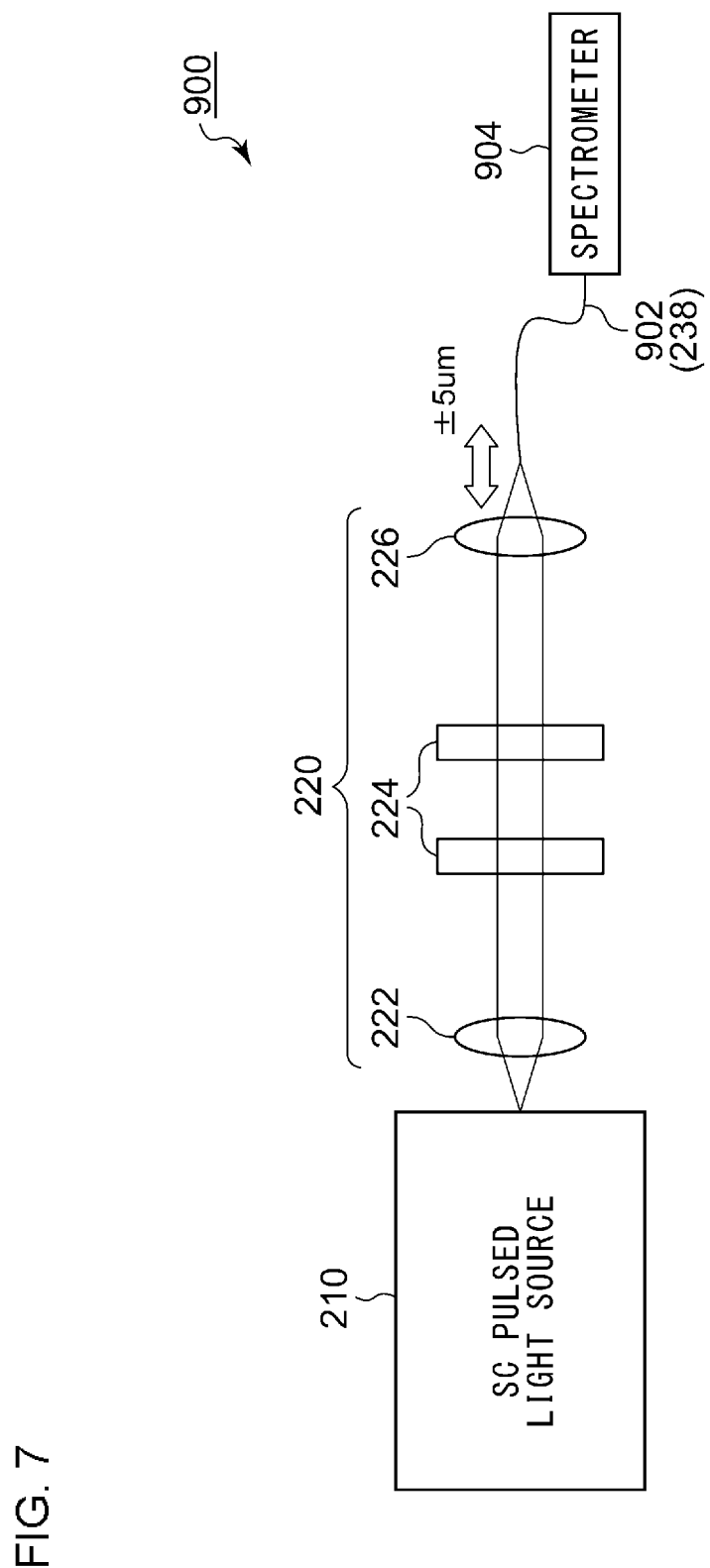
FIG. 7 is a diagram illustrating a setup of an experiment for examining an influence of a shift of relative position between a condensing position of a condenser lens and an incident end of an optical divider in FIG. 6.

FIG. 7 is a diagram illustrating a setup 900 of an experiment for examining an influence of a shift of relative position between a condensing position of the condenser lens 226 and the incident end of the optical divider 230 in FIG. 6. In the setup 900, a single-mode fiber 902 simulates the incident side fiber 238 in FIG. 6. The emitted light from the single-mode fiber 902 is measured by a spectrometer 904.

Figure 8:
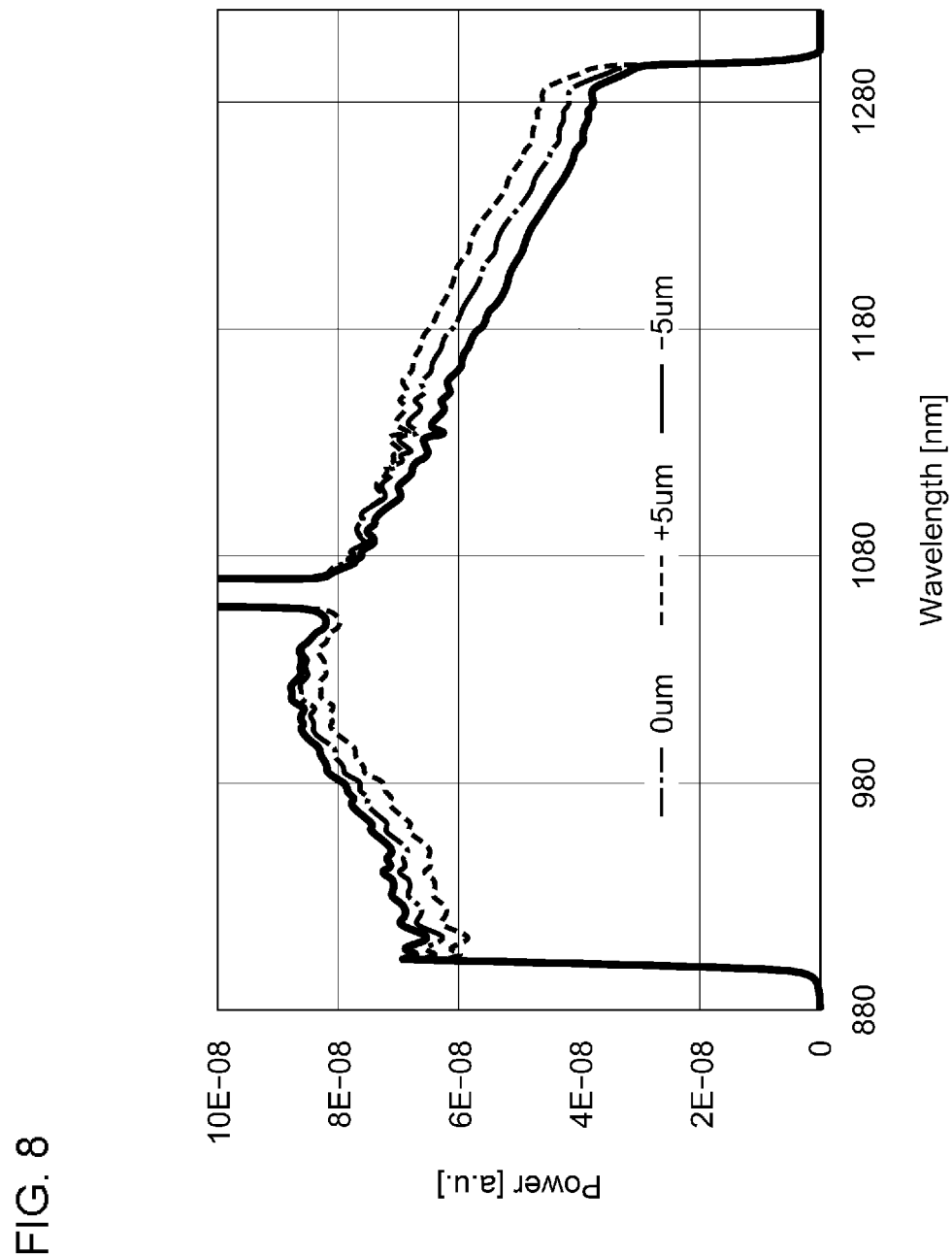
FIG. 8 is a diagram illustrating a spectrum when a focal position of the condenser lens is changed by ±5 μm in an optical axis direction in the setup in FIG. 7.

FIG. 8 is a diagram illustrating a spectrum when a focal position of the condenser lens 226 is changed by ±5 μm in an optical axis direction in the setup in FIG. 7. As illustrated in FIG. 8, the inventors of the present invention have independently found that the light-amount variation due to the shift of relative position between the focal position and the single-mode waveguide has a wavelength dependency.

In particular, the wavelength dependency on the spectrum seen in FIG. 8 appears on the long-wavelength side and on the short-wavelength side complementarily. That is, when the intensity on the long-wavelength side increases, the intensity on the short-wavelength side decreases, and conversely, when the intensity on the long-wavelength side decreases, the intensity on the short-wavelength side increases. In such a case where there is wavelength dependency, in a method of collectively monitoring all wavelengths as in Example 1, it is not possible to detect a local light-amount variation in a wide wavelength region (for example, 900 nm to 1300 nm) used for spectrometry. This is because the increase or decrease in the intensity on the short-wavelength side and the increase or decrease in the intensity on the long-wavelength side cancel each other, so that the light amount in the entire wavelength region changes little.

Figure 9:
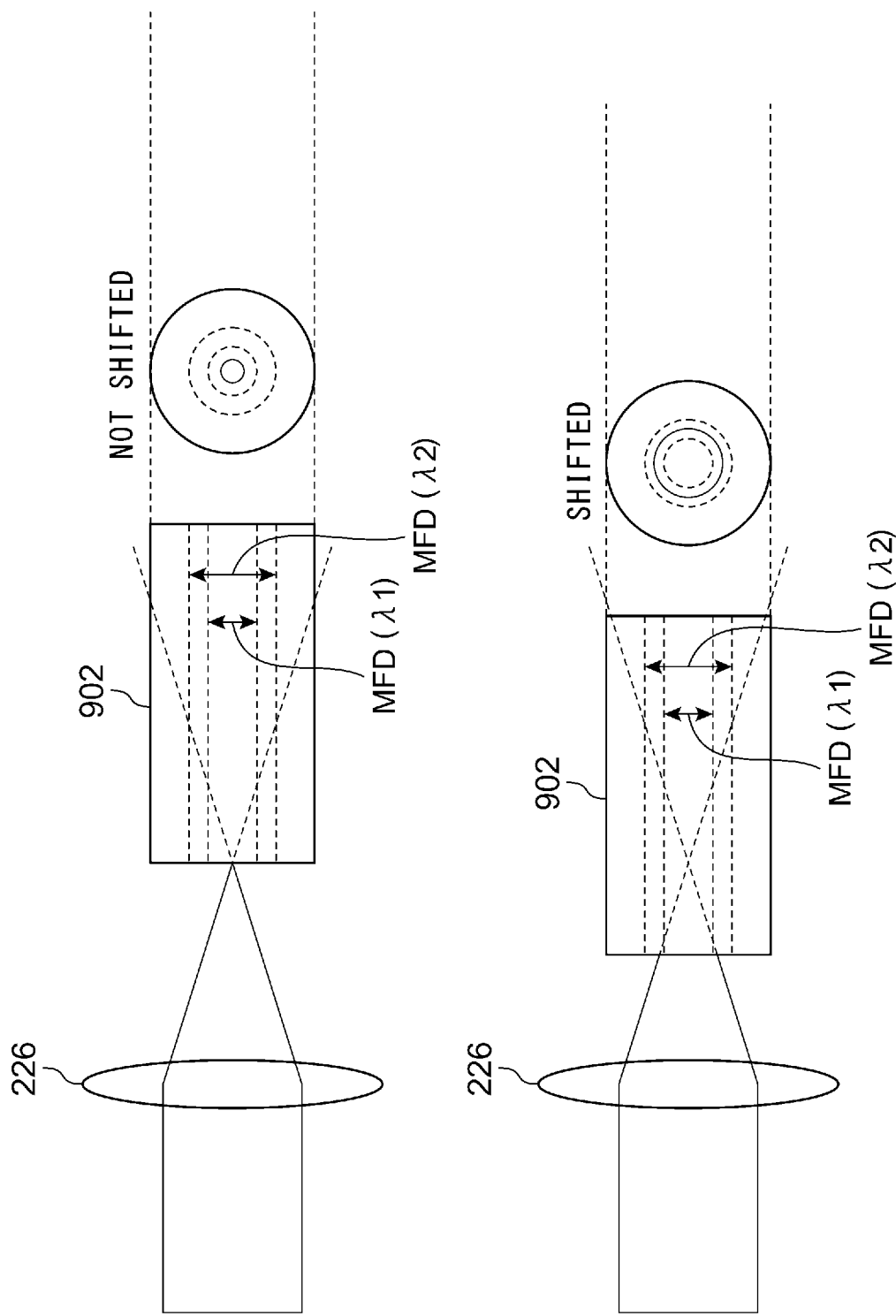
FIG. 9 is a diagram for explaining a first cause of a wavelength dependency on light-amount variation.

FIG. 9 is a diagram for explaining a first cause of a wavelength dependency on light-amount variation. One of the causes of the wavelength dependency is the wavelength dependency on the mode field diameter (MFD) of the single-mode waveguide. In FIG. 9, the upper part illustrates a state where the focal position is appropriate, and the lower part illustrates a case where the focal position is shifted. Since the width (MFD) of the region through which the light in the single-mode waveguide propagates varies for each wavelength, the degree of decrease in the incident efficiency varies for each wavelength when the focal position is shifted as illustrated in the lower part of FIG. 9. Alternatively, in a case where the condensing diameter of the broadband pulsed light L1$a$ varies for each wavelength, the wavelength dependency appears for the same reason.

Figure 10:
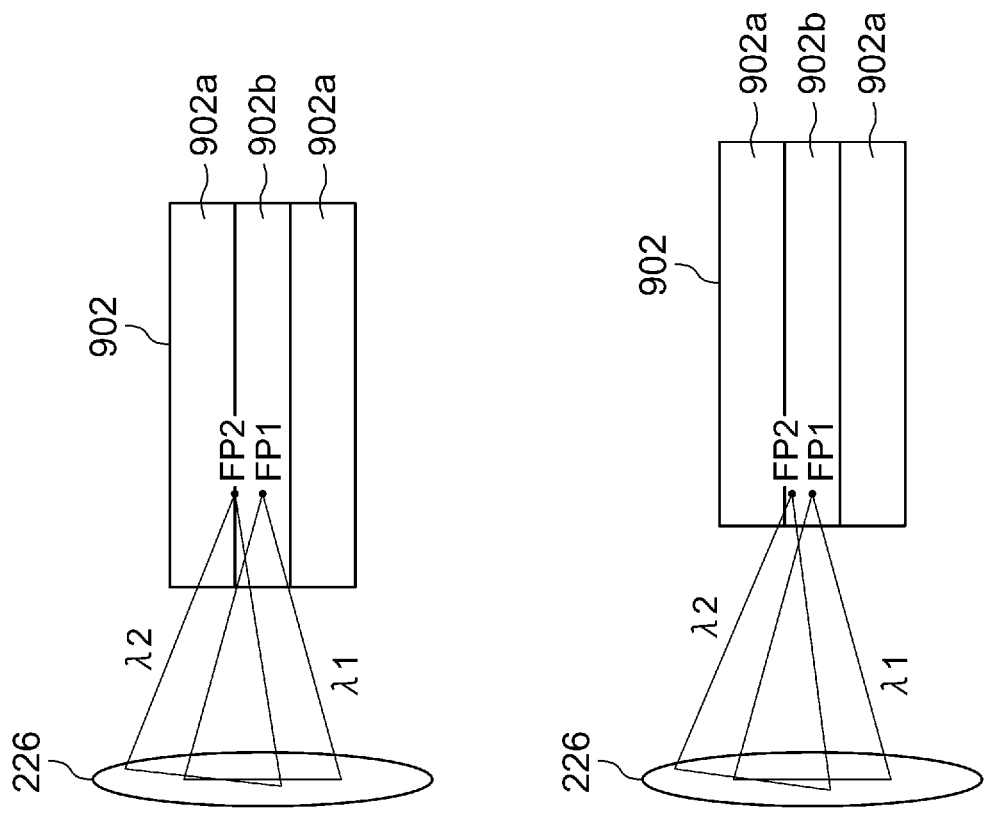
FIG. 10 is a diagram for explaining a second cause of a wavelength dependency on light-amount variation.

FIG. 10 is a diagram for explaining a second cause of a wavelength dependency on light-amount variation. Another cause of the wavelength dependency may come out when the incident angle of a beam on the condenser lens 226 varies for each wavelength. When the incident angle of the beam has wavelength dependency, the focal position FP is shifted. For example, when the radiation angle of the broadband pulsed light L1$a$ from the pulsed light source 210 varies for each wavelength, such a shift in the focal position FP may occur.

Reference numeral 902$a$ denotes a clad, and reference numeral 902$b$ denotes a core. In FIG. 10, the upper part and the lower part illustrate two states in which the focal positions in the optical axis direction are different. When the focal position is shifted, the coupling efficiency with respect to the core 902$b$ changes for each wavelength. In general, when the incident angle θ of the beam is minute, the focal position shift d is about d≈fθ where f is the focal length of the condenser lens.

Conversely, if the spectral variation of the wavelength scanning light L1 can be accurately monitored, it can be said that the shift of the focal position and the variation of the radiation angle from the pulsed light source 210 can be estimated. In Example 2, a light source apparatus 200B capable of detecting a light-amount variation having a wavelength dependency, that is, a spectral variation of the wavelength scanning light L1 will be described.

Figure 11:
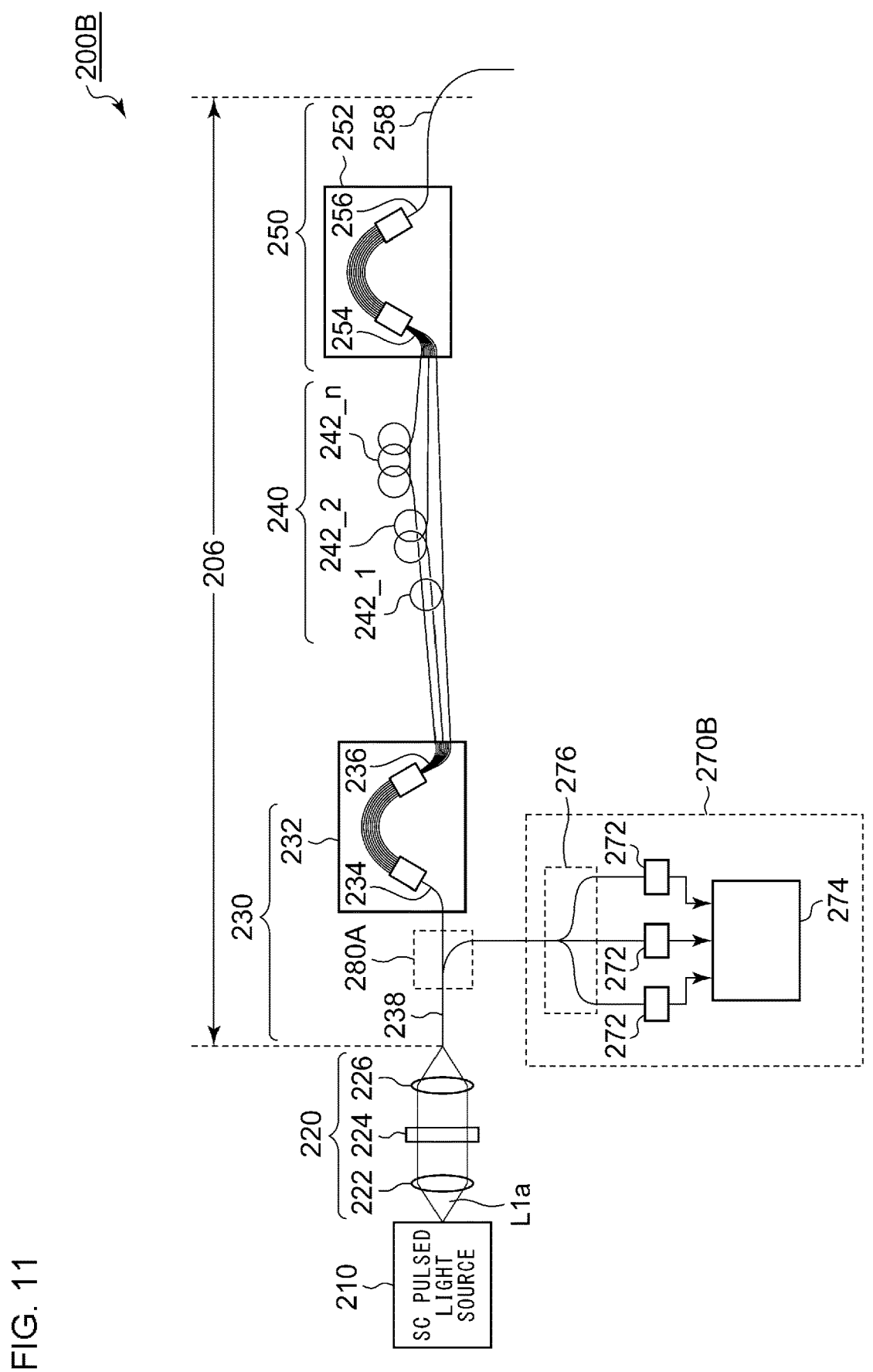
FIG. 11 is a diagram illustrating the light source apparatus according to Example 2.

FIG. 11 is a diagram illustrating the light source apparatus 200B according to Example 2. The light monitoring device 270B of the light source apparatus 200B separates and measures the light split by the optical coupler 280A for each wavelength.

When the cost allows, the light monitoring device 270B may include the spectrometer 904 as illustrated in FIG. 7. However, the spectral variation does not occur randomly for each wavelength, and as illustrated in FIG. 8, the variation on the short-wavelength side and the variation on the long-wavelength side often occur symmetrically. In this case, it can be said that it is sufficient to measure the intensity of least one wavelength for each of the short-wavelength side and the long-wavelength side. For example, in the example of FIG. 8, it is sufficient to monitor about three wavelengths of a center wavelength (1080 nm), one wavelength band (for example, 980 nm) on the short-wavelength side, and one wavelength band (for example, 1180 nm) on the long-wavelength side.

For example, the light monitoring device 270B includes a WDM coupler 276, a plurality of light detectors 272, and the arithmetic processing device 274. The WDM coupler 276 splits the light extracted by an optical coupler 280A into a plurality of m (m≥2) beams according to wavelengths. m is the number of wavelength bands to be monitored, and may be about two to six. The light detectors 272 detects the intensity of the light split by the optical coupler 280A. As a result, it is possible to measure a light amount for each wavelength and to detect a spectral variation.

Example 3

Figure 12:
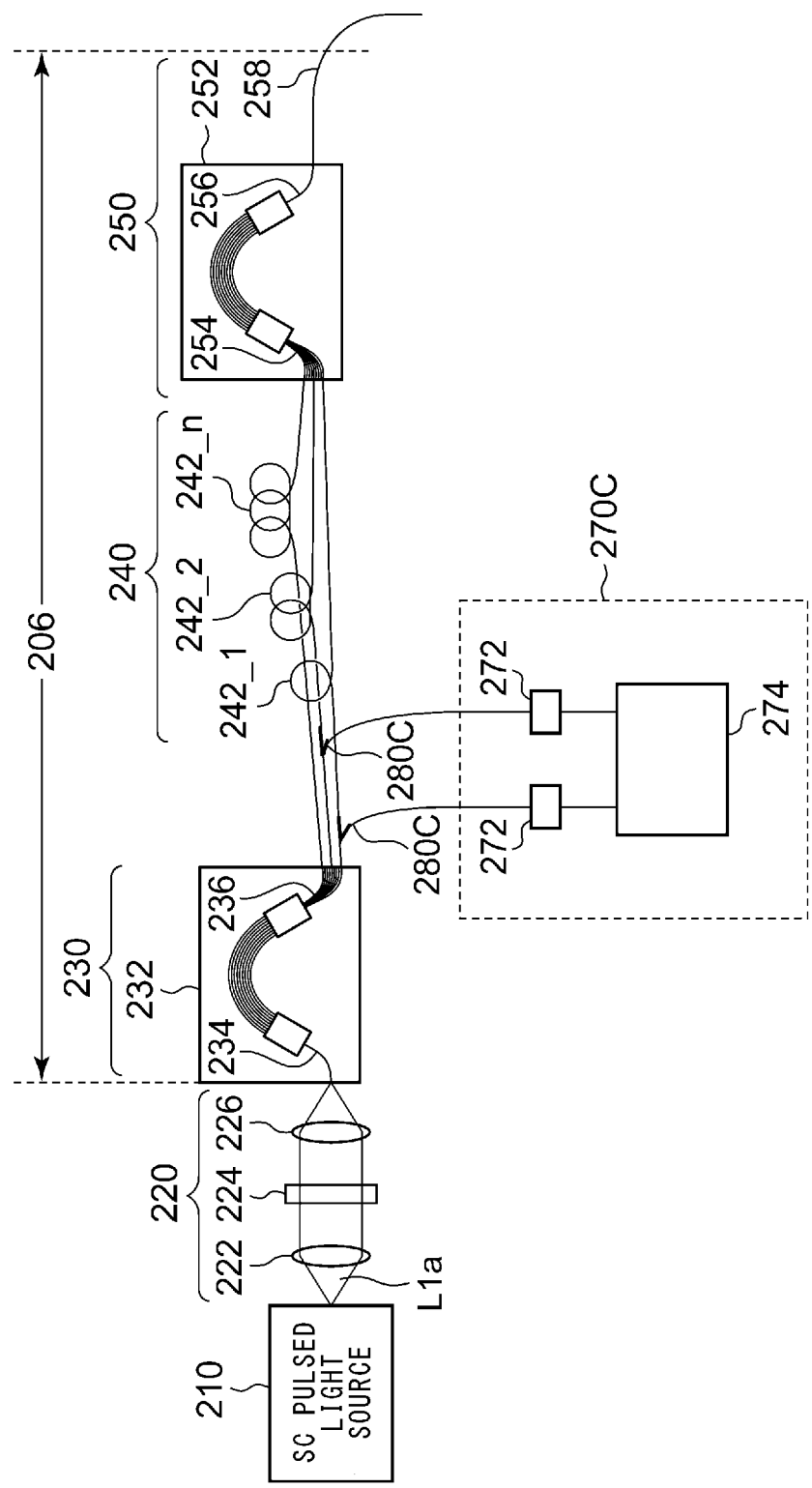
FIG. 12 is a diagram illustrating the light source apparatus according to Example 3.

FIG. 12 is a diagram illustrating a light source apparatus 200C according to Example 3. A light monitoring device 270C monitors light extracted from the position (iv) in FIG. 3. In FIG. 12, the incident side fiber 238 is omitted and the beam collected by the condenser lens 226 is coupled to the incident end of the first AWG 232.

Optical couplers 280C are provided to m (1≤m≤n) fibers out of the n fibers 242, through which beams having wavelengths to be monitored propagate.

The light monitoring device 270C includes the plurality of m light detectors 272 and the arithmetic processing device 274. Each of the light detectors 272 detects the intensity of the light split by the corresponding optical coupler 280C. With this configuration, it is possible to measure a light amount for each wavelength and to detect a spectral variation.

An experiment conducted to examine the light source apparatus 200C in FIG. 12 will be described. In the experiment, a spectrometer was connected to the emission end of the emission side fiber 258, and the temporal change of the spectrum of the wavelength scanning light L1 was measured. m that is the number of measurement points of the spectrum was three, and the optical couplers 280C were connected to the fibers 242 corresponding to three wavelengths of 908 nm, 1067 nm, and 1297 nm.

In the experiment, the temperature in the light source apparatus 200 was intentionally varied over time to intentionally induce the shift of position between the focal position of the beam and the incident end of the optical divider 230, thereby generating the spectral variation.

Figure 13:
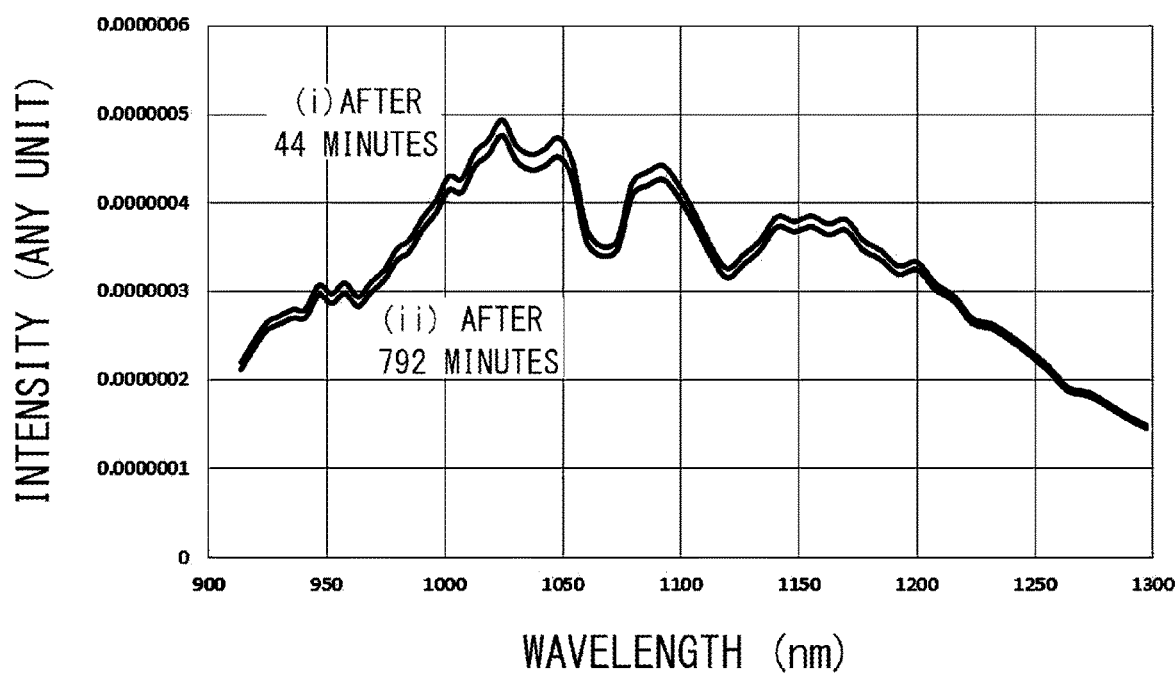
FIG. 13 is a diagram illustrating spectra that were measured after 44 minutes and 792 minutes have passed since the start of the test by the spectrometer.

FIG. 13 is a diagram illustrating spectra that were measured at position (i) and position (ii) after 44 minutes and 792 minutes have passed since the start of the test, respectively, by the spectrometer. It can be seen that variations of several percentages appear over the entire wavelength range and the variation ratios thereof have a wavelength dependency.

Figure 14A:
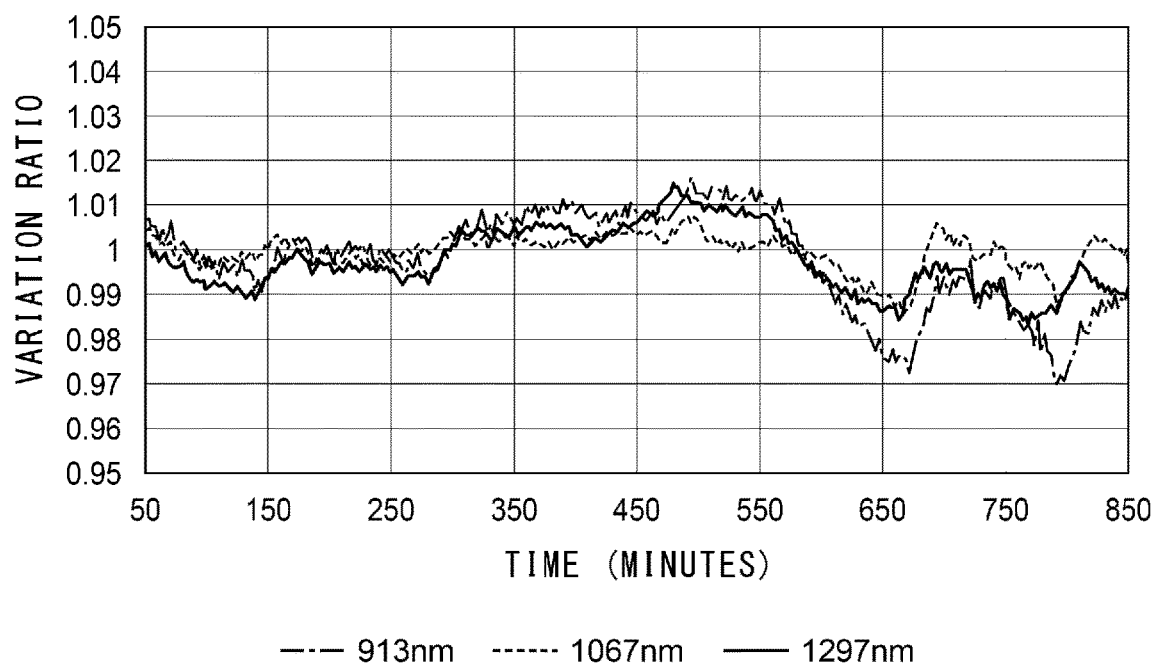
FIG. 14A is a diagram illustrating temporal light-amount variations of three wavelengths measured by a spectrometer.
Figure 14B:
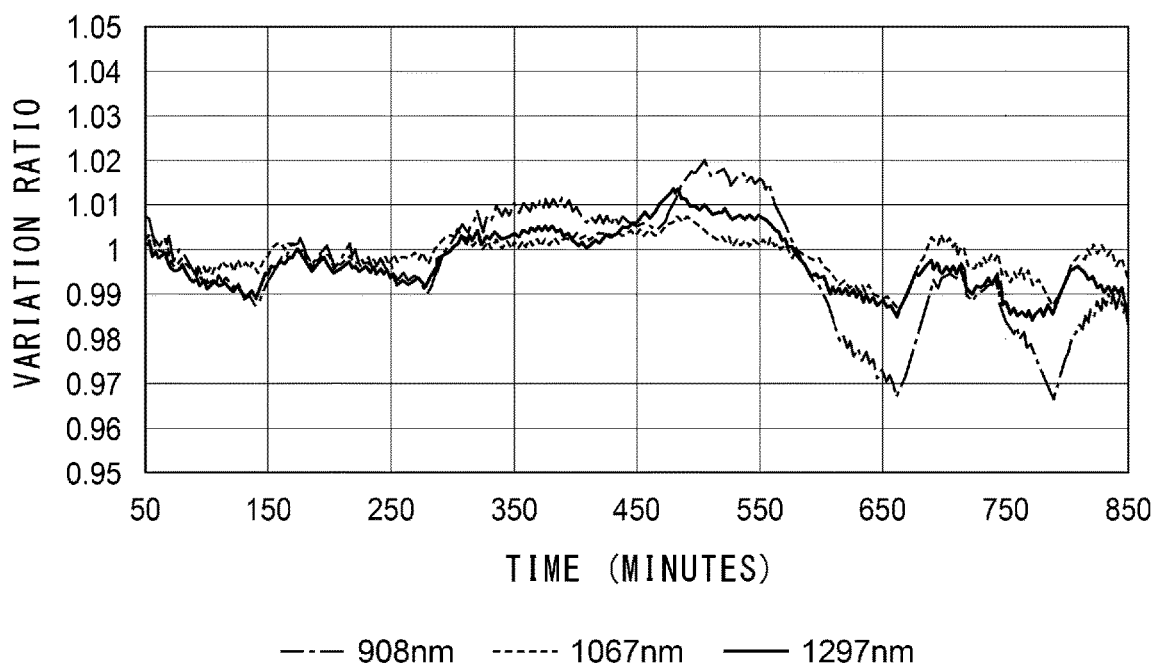
FIG. 14B is a diagram illustrating temporal light-amount variations of three wavelengths measured by a light monitoring device in FIG. 12.

FIG. 14A is a diagram illustrating temporal light-amount variations of three wavelengths measured by a spectrometer, and FIG. 14B is a diagram illustrating temporal light-amount variations of three wavelengths measured by the light monitoring device 270C in FIG. 12. As the three wavelengths illustrated in FIG. 14A, three points (913 nm, 1067 nm, and 1297 nm) closest to the three wavelengths (908 nm, 1067 nm, 1297 nm in FIG. 14B) measured by the light monitoring device 270C were selected.

It can be seen from the comparison between FIGS. 14A and 14B, the light monitoring device 270 in FIG. 12 demonstrated that the light-amount variation for each wavelength can be measured with equivalent accuracy as in the case of measurement with the spectrometer.

In FIG. 12, the optical couplers 280C are inserted in the fibers 242 at the positions in the side on the optical divider 230 (the position (iv) in FIG. 3), but the configuration is not limited thereto. The optical couplers 280C may be inserted in the fibers 242 at the positions in the side on the coupler 250 (the position (v) in FIG. 3) to measure the beams to which delays have been added by the delay line.

Example 4

Figure 15:
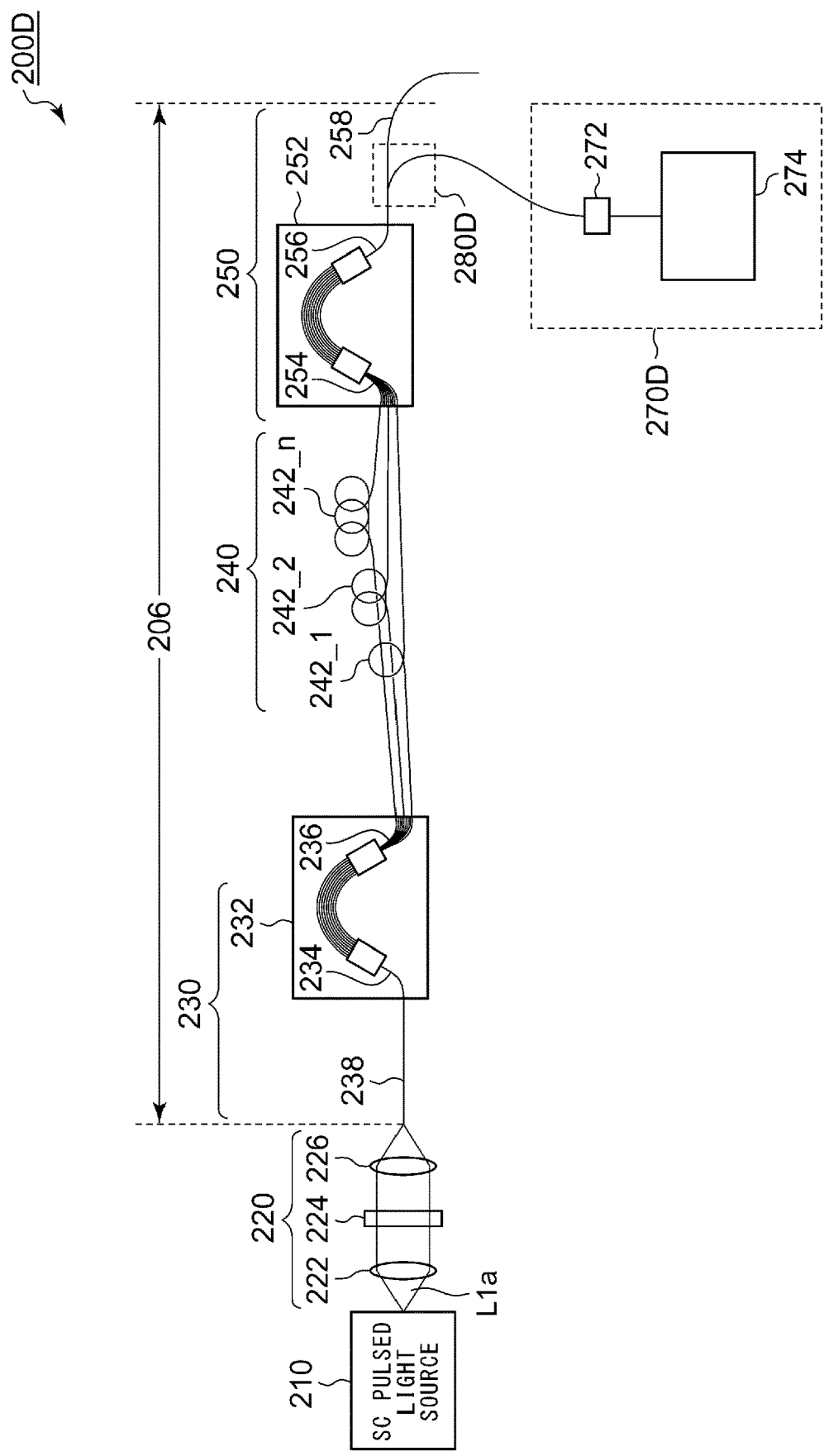
FIG. 15 is a diagram illustrating the light source apparatus according to Example 4.

FIG. 15 is a diagram illustrating a light source apparatus 200D according to Example 4. A light monitoring device 270D monitors light extracted from the position (viii) in FIG. 3. The light source apparatus 200D includes an optical coupler 280D provided to the emission side fiber 258 and structured to extract part of light propagating through the emission side fiber 258. In FIG. 15, the incident side fiber 238 may be omitted.

The light monitoring device 270D includes the light detector 272 and the arithmetic processing device 274. The light detector 272 detects the intensity of the light split by the optical coupler 280D. Here, since the light split by the optical coupler 280D is part of the wavelength scanning light L1 that has passed through the delay line 240, the time and the wavelength correspond to each other on a one-to-one basis. Therefore, the light detector 272 may measure the time waveform of the light extracted by the optical coupler 280D. The arithmetic processing device 274 may convert the time waveform measured by the light detector 272 into spectral information and detect the light amount of each wavelength.

Alternatively, in the light source apparatus 200D in FIG. 15, the light monitoring device 270B in FIG. 11 may be used instead of the light monitoring device 270D.

Example 5

Figure 16:
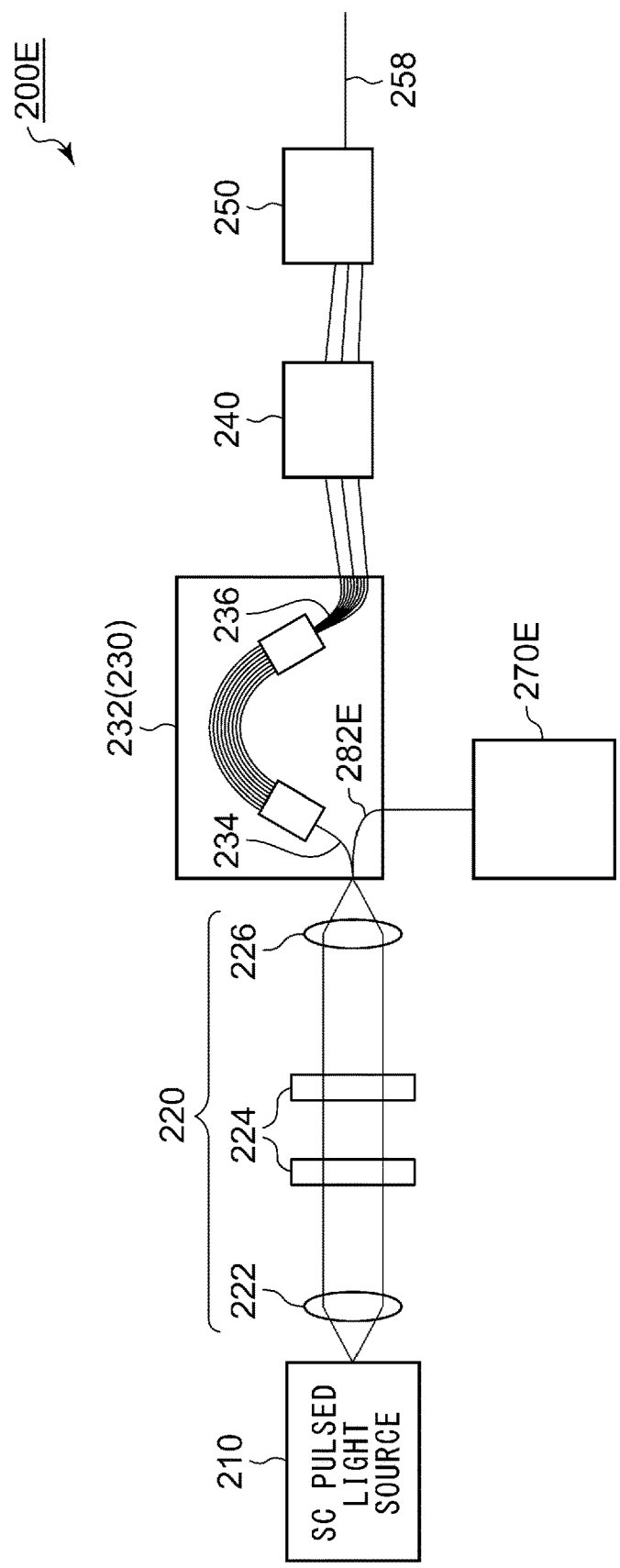
FIG. 16 is a diagram illustrating the light source apparatus according to Example 5.

FIG. 16 is a diagram illustrating a light source apparatus 200E according to Example 5. A light monitoring device 270E monitors light extracted from the position (ii) in FIG. 3.

The light source apparatus 200E further includes a waveguide demultiplexer 282E formed on the same PLC as the first AWG 232. The waveguide demultiplexer 282E extracts part of light propagating through the input waveguide 234 of the first AWG 232 to the outside.

The light monitoring device 270E monitors light extracted by the waveguide demultiplexer 282E. The light monitoring device 270E can be configured similarly to the light monitoring device 270A in FIG. 6 or the light monitoring device 270B in FIG. 11.

Example 6

Figure 17:
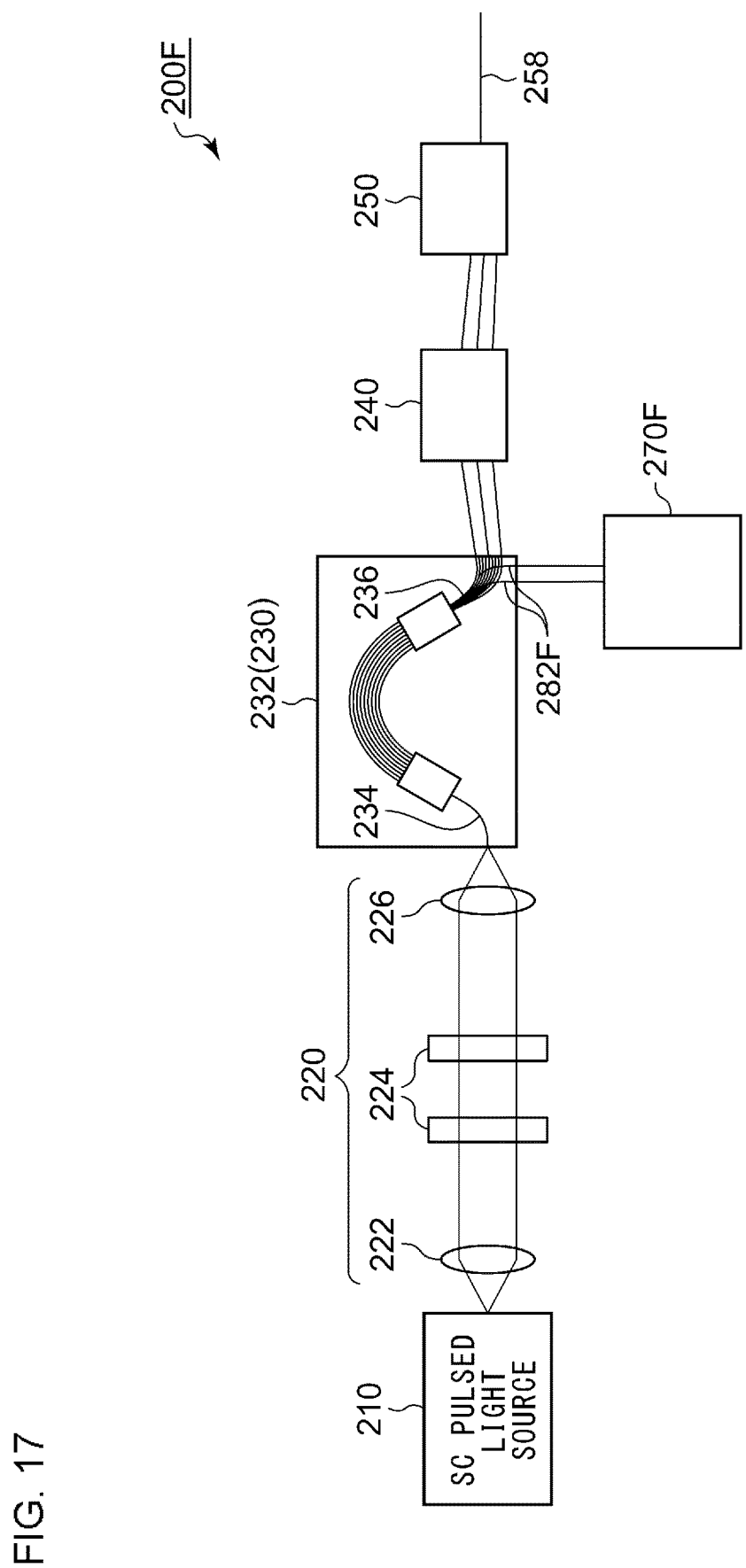
FIG. 17 is a diagram illustrating the light source apparatus according to Example 6.

FIG. 17 is a diagram illustrating a light source apparatus 200F according to Example 6. A light monitoring device 270F monitors light extracted from the position (iii) in FIG. 3.

The light source apparatus 200F further includes waveguide demultiplexers 282F formed on the same PLC as the first AWG 232. The waveguide demultiplexers 282F each extract part of the light propagating through each of the m output waveguides 236 out of the n output waveguides 236 of the first AWG 232 to the outside.

The light monitoring device 270F monitors light extracted by the waveguide demultiplexers 282F. The light monitoring device 270F can be configured similarly to the light monitoring device 270C in FIG. 12.

Example 7

A light source apparatus according to Example 7 will be described with reference to FIG. 3. The light monitoring device 270 monitors light extracted from the position (vi) in FIG. 3. The light source apparatus includes m waveguide demultiplexers formed on the same PLC as the second AWG 252. Each waveguide demultiplexer splits part of light propagating through the corresponding input waveguide 254. In Example 7, the light monitoring device 270 can be configured similarly to the light monitoring device 270C in FIG. 12.

Example 8

A light source apparatus according to Example 8 will be described with reference to FIG. 3. The light monitoring device 270 monitors light extracted from the position (vii) in FIG. 3. The light source apparatus includes a waveguide demultiplexer formed on the same PLC as the second AWG 252. The waveguide demultiplexer splits part of light propagating through the output waveguide 256 of the second AWG 252. In Example 8, the light monitoring device 270 can be configured similarly to the light monitoring device 270D in FIG. 15 or the light source apparatus 200C in FIG. 12.

Modifications

The embodiments described above are intended to be illustrative only, and It will be understood by those skilled in the art that various modifications can be made to combinations of their components and processing processes. Hereinafter, such modifications will be described.

In the embodiment, the coupler 250 is configured by the second AWG 252, but the configuration of the coupler 250 is not limited thereto, and other known techniques may be used, or yet another technique available in the future may be used. In the coupler 250, in a case where the light is emitted from the waveguide structure 206 to free space, the light monitoring device 270 may monitor light extracted from the waveguide structure 206 before being emitted to free space.

In addition, the wavelength selector 220 may be omitted. In this case, the pulsed light source 210 and the optical divider 230 can be connected by the incident side fiber 238 without using free space.

In the embodiment, the light source apparatus 200 and the spectroscopic head 300 are connected through a fiber, but the configuration is not limited thereto. The wavelength scanning light L1 may be supplied from the light source apparatus 200 to the spectroscopic head 300 by using free space.

Although the embodiment according to the present disclosure has been described using specific terms, this description is merely an example for assisting understanding, and does not limit the present disclosure or the claims. The scope of the present invention is defined by the claims, and therefore, embodiments, examples, and modifications that are not described herein are also included in the scope of the present invention.

What is claimed is:

1. A light measurement device comprising:
a light source apparatus structured to generate wavelength scanning light to be irradiated onto an object; and
a light receiving device structured to measure object light obtained by irradiating the object with the wavelength scanning light,
wherein the light source apparatus comprises:
a pulsed light source structured to generate pulsed light including a continuous spectrum;
an optical divider structured to spatially divide the pulsed light into n portions of light (n≥2) according to wavelengths;
a plurality of n fibers structured to provide different delays to the n portions of light; and
a coupler structured to combine the n portions of light output from the n fibers, wherein
the light output from the coupler is irradiated onto the object as the wavelength scanning light,
at least a portion from an incident end of the optical divider to an emission ends of the n fibers is formed of a continuous waveguide structure, and
wherein the light source apparatus further comprises a light monitoring device structured to extract and measure part of light propagating through the continuous waveguide structure.

2. The light measurement device according to claim 1, wherein the light source apparatus further comprises m optical couplers disposed along m different fibers selected from the n fibers, where 1≤m≤n,
each of the m optical couplers being configured to extract a portion of light propagating through the respective fiber, and
wherein the light monitoring device is configured to measure m portions of light extracted by the m optical couplers.

3. The light measurement device according to claim 2, wherein m satisfies m≥2.

4. The light measurement device according to claim 1, wherein
the optical divider includes:
an incident side fiber having an incident end on which the pulsed light is incident; and
a first arrayed waveguide grating including an input waveguide connected to an output end of the incident side fiber, and n output waveguides, the first arrayed waveguide grating being structured to divide light propagating through the input waveguide into the n output waveguides according to wavelengths,
the light source apparatus further comprises an optical coupler provided to the incident side fiber and structured to extract part of the pulsed light propagating through the incident side fiber, and
the light monitoring device measures the light extracted from the incident side fiber by the optical coupler.

5. The light measurement device according to claim 4, wherein the light monitoring device includes a wavelength division multiplexing (WDM) coupler structured to divide the light extracted from the incident side fiber by the optical coupler into m (m≥2) portions of light according to wavelengths, and measures each of the m portions of light divided by the WDM coupler.

6. The light measurement device according to claim 1, wherein
the coupler includes:
a second arrayed waveguide grating including n input waveguides connected to the n fibers, and an output waveguide, the second arrayed waveguide grating being structured to multiplex the n portions of light propagating through the n input waveguides and output the multiplexed light to the output waveguide; and
an emission side fiber having an incident end connected to the output waveguide of the second arrayed waveguide grating,
the light source apparatus further comprises an optical coupler provided to the emission side fiber and structured to extract part of the light propagating through the emission side fiber, and
the light monitoring device measures the light extracted from the emission side fiber by the optical coupler.

7. The light measurement device according to claim 6, wherein
the light monitoring device includes a wavelength division multiplexing (WDM) coupler structured to divide the light extracted from the emission side fiber by the optical coupler into m (m≥2) portions of light according to wavelengths, and
the light monitoring device measures each of the m portions of light divided by the WDM coupler.

8. The light measurement device according to claim 6, wherein the light monitoring device measures a time waveform of the light extracted from the emission side fiber by the optical coupler.

9. The light measurement device according to claim 1, wherein
the optical divider includes a first arrayed waveguide grating including an input waveguide structured to receive the pulsed light, and n output waveguides, the first arrayed waveguide grating being structured to divide light propagating through the input waveguide into the n output waveguides according to wavelengths,
the light source apparatus further comprises a waveguide demultiplexer formed on a same planar lightwave circuit (PLC) as the first arrayed waveguide grating, the waveguide demultiplexer being structured to extract part of light propagating through the input waveguide of the first arrayed waveguide grating, and
the light monitoring device monitors light extracted by the waveguide demultiplexer.

10. The light measurement device according to claim 1, wherein
the optical divider includes a first arrayed waveguide grating including an input waveguide structured to receive the pulsed light, and n output waveguides, the first arrayed waveguide grating being structured to split light propagating through the input waveguide into the n output waveguides according to wavelengths,
the light source apparatus further comprises m waveguide demultiplexers formed on a same planar lightwave circuit (PLC) as the first arrayed waveguide grating and corresponding to m (1≤m≤n) output waveguides out of the n output waveguides of the first arrayed waveguide grating,
each of the waveguide demultiplexers is structured to extract part of light propagating through the corresponding output waveguide, and
the light monitoring device is structured to monitor m portions of light extracted by the m waveguide demultiplexers.

11. The light measurement device according to claim 1, wherein the coupler includes a second arrayed waveguide grating including n input waveguides connected to the n fibers, and an output waveguide, the second arrayed waveguide grating being structured to multiplex the n portions of light propagating through the n input waveguides and output the multiplexed light to the output waveguide, the light source apparatus further comprises m waveguide demultiplexers formed on a same planar lightwave circuit (PLC) as the second arrayed waveguide grating and corresponding to m (1≤ m≤n) input waveguides out of the n input waveguides of the second arrayed waveguide grating, each of the waveguide demultiplexers is structured to extract part of light propagating through the corresponding input waveguide, and the light monitoring device is structured to monitor m portions of light extracted by the m waveguide demultiplexers.

12. The light measurement device according to claim 10, wherein m satisfies m≥2.

13. The light measurement device according to claim 1, wherein the coupler includes a second arrayed waveguide grating including n input waveguides connected to the n fibers, and an output waveguide, the second arrayed waveguide grating being structured to multiplex the n portions of light propagating through the n input waveguides and output the multiplexed light to the output waveguide, the light source apparatus further comprises a waveguide demultiplexer formed on a same planar lightwave circuit (PLC) as the second arrayed waveguide grating and structured to extract part of light propagating through the output waveguide of the second arrayed waveguide grating, and the light monitoring device monitors light extracted by the waveguide demultiplexer.

14. The light measurement device according to claim 1, wherein the light source apparatus further comprises a wavelength selective filter disposed between the pulsed light source and the optical divider.

* * * * *